(12) United States Patent
Vogt et al.

(10) Patent No.: US 11,852,564 B2
(45) Date of Patent: *Dec. 26, 2023

(54) DEVICE AND METHOD FOR LEAKAGE TESTING OF A CONNECTION BETWEEN A RUBBER STOPPER AND A CORRESPONDING DRUG CONTAINER

(71) Applicant: Lonza Ltd, Visp (CH)

(72) Inventors: Martin Vogt, Allschwil (CH); Roman Mathaes, Basel (CH); Hanns-Christian Mahler, Loerrach (DE); Atanas Koulov, Basel (CH); Gabriele Roidl, Erlinsbach (CH); Franziska Riesen Fuchs, Aarau (CH)

(73) Assignee: Lonza Ltd

( * ) Notice: Subject to any disclaimer, the term of this patent is extended or adjusted under 35 U.S.C. 154(b) by 0 days.

This patent is subject to a terminal disclaimer.

(21) Appl. No.: 17/984,769

(22) Filed: Nov. 10, 2022

(65) Prior Publication Data

US 2023/0134438 A1    May 4, 2023

Related U.S. Application Data

(63) Continuation of application No. 17/414,552, filed as application No. PCT/EP2019/085748 on Dec. 17, 2019, now Pat. No. 11,499,885.

(Continued)

(30) Foreign Application Priority Data

Dec. 17, 2018 (EP) .................... 18213204
Mar. 26, 2019 (EP) .................... 19165311
Sep. 27, 2019 (EP) .................... 19200174

(51) Int. Cl.
  *G01M 3/22* (2006.01)
  *G01M 3/28* (2006.01)

(52) U.S. Cl.
  CPC .......... *G01M 3/223* (2013.01); *G01M 3/2853* (2013.01)

(58) Field of Classification Search
  CPC ...................... G01M 3/223; G01M 3/2853
  See application file for complete search history.

(56) References Cited

U.S. PATENT DOCUMENTS 8,316,697 B1    11/2012   Tuomela et al.
9,579,458 B2    2/2017    Holmqvist
(Continued)

FOREIGN PATENT DOCUMENTS

CN    201002789    1/2008
CN    201828385    5/2011
(Continued)

OTHER PUBLICATIONS

International Preliminary Report on Patentability dated Mar. 22, 2021 for corresponding International (PCT) Patent Application No. PCT /EP2019/085748 with an international filing date of Dec. 17, 2019.

(Continued)

*Primary Examiner* — David Z Huang
(74) *Attorney, Agent, or Firm* — Pandiscio & Pandiscio

(57) ABSTRACT

The invention concerns the field of container closure integrity (CCI) and the testing of CCI and relates to a device and a method for providing a displacement of a rubber stopper for leakage testing of a connection between the rubber stopper and a corresponding drug container which can be used for storing drugs under sterile conditions and which is closed by said rubber stopper.

11 Claims, 22 Drawing Sheets

Related U.S. Application Data

(60) Provisional application No. 62/780,493, filed on Dec. 17, 2018.

(56) References Cited

U.S. PATENT DOCUMENTS

| | | |
|---|---|---|
| 11,499,885 B2 * | 11/2022 | Vogt ................... G01M 3/223 |
| 2005/0236440 A1 | 10/2005 | Cho |
| 2008/0312607 A1 | 12/2008 | Delmotte et al. |
| 2018/0186528 A1 | 7/2018 | Tonn et al. |
| 2018/0240540 A1 | 8/2018 | O'Keefe |
| 2021/0389206 A1 | 12/2021 | Vogt et al. |

FOREIGN PATENT DOCUMENTS

| | | |
|---|---|---|
| CN | 104943963 | 9/2015 |
| CN | 205293539 | 6/2016 |
| CN | 207816521 | 9/2018 |
| DE | 102006047040 | 3/2008 |
| GB | 2222687 | 9/1989 |
| WO | WO 2015/108423 | 7/2015 |

OTHER PUBLICATIONS

International Search Report and Written Opinion dated Mar. 5, 2020 for corresponding International (PCT) Patent Application No. PCT/EP2019/085748 with an international filing date of Dec. 17, 2019.

* cited by examiner

US 11,852,564 B2

DEVICE AND METHOD FOR LEAKAGE TESTING OF A CONNECTION BETWEEN A RUBBER STOPPER AND A CORRESPONDING DRUG CONTAINER

REFERENCE TO PENDING PRIOR PATENT APPLICATIONS

This patent application is a continuation of pending prior U.S. patent application Ser. No. 17/414,552, filed Jun. 16, 2021 by Lonza Ltd for DEVICE AND METHOD FOR LEAKAGE TESTING OF A CONNECTION BETWEEN A RUBBER STOPPER AND A CORRESPONDING DRUG CONTAINER, which patent application in turn:
 (1) is a 371 national stage entry of prior International (PCT) Patent Application No. PCT/US19/85748, filed Dec. 17, 2019 by Lonza Ltd for DEVICE AND METHOD FOR LEAKAGE TESTING OF A CONNECTION BETWEEN A RUBBER STOPPER AND A CORRESPONDING DRUG CONTAINER, which patent application in turn:
  (a) claims benefit of prior U.S. Provisional Patent Application Ser. No. 62/780,493, filed Dec. 17, 2018;
  (b) claims benefit of prior European Patent Application No. EP 18213204.3, filed Dec. 17, 2018;
  (c) claims benefit of prior European Patent Application No. EP 19165311.2, filed Mar. 26, 2019; and
  (d) claims benefit of prior European Patent Application No. EP 19200174.1, filed Sep. 27, 2019.

The six (6) above-identified patent applications are hereby incorporated herein by reference.

FIELD OF THE INVENTION

The invention concerns the field of container closure integrity (CCI) and the testing of CCI and relates to a device and a method for leakage testing of a connection between a rubber stopper and a corresponding drug container which can be used for storing drugs under sterile conditions and which is closed by said rubber stopper.

TECHNOLOGICAL BACKGROUND

A drug container, which can be used for storing drugs under sterile conditions and which is closed by a rubber stopper, can e.g. be a vial or a cartridge.

A vial, also known as a phial or flacon, is a small glass or plastic vessel or bottle which is often used to store medication as liquids or as solids such as powders or capsules. They can also be used as scientific sample vessels. In particular, vials are used as storage for small quantities of a solid material or a liquid used in pharmaceutical, medical or scientific applications, such as microbiology molecular biology or genetic applications.

A cartridge can be used to store compositions in liquid form.

A drug container usually comprises a top-side opening which can be sealed by a correspondingly shaped rubber stopper.

It is often of significant importance, e.g. in medical applications, to ensure integrity of the closure, in particular of the sealing provided by the rubber stopper, to avoid any contamination of the product stored in the drug container. During production, packaging or transport, or any other handling, the drug container may be exposed to an external influence, such that the rubber stopper may be displaced with respect to the drug container from its initial sealing position in an opening direction over such a distance that the container starts leaking.

Therefore it is desirable to have an indication of the tolerance of the flexible part, that is the rubber stopper, against movement until a leak occurs. In particular, it would be beneficial to have a possibility to assess whether a rubber stopper which has been extracted from its initial sealing position by a predetermined threshold distance, herein also called predetermined threshold travel or predetermined threshold value, still prevents leakage. There was a need for testing CCI of a connection between a rubber stopper and a corresponding drug container and for examining the quality of a combination of a rubber stopper and a corresponding drug container.

The present invention provides means for CCI testing in form of a device and a method for providing a displacement of a rubber stopper for leakage testing of a connection between the rubber stopper and a corresponding drug container. It is a further object of the present invention to provide the possibility of examining the quality of a combination of a drug container and a rubber stopper.

The above objects are solved by a device for providing a displacement of a rubber stopper for leakage testing of a connection between a rubber stopper and a corresponding drug container comprising the features according to the device claims. Furthermore, the above objects are solved by a method for providing a displacement of a rubber stopper for leakage testing of a connection between the rubber stopper and a corresponding drug container, preferably a vial or a cartridge, comprising the features according to the method claims.

SUMMARY OF THE INVENTION

Subject of the invention is a device (1) for providing a displacement of a rubber stopper (2), which is inserted into the regular opening (30) of a drug container (3), relative to the drug container (3) in an opening direction (32) for testing of a connection between the rubber stopper (2) and the corresponding drug container (3), the device (1) comprising
 a support member (70)
 a movement member (71),
 a drug container receptacle (5) for receiving the container (3),
 wherein
 the support member (70) supports the movement member (71),
 the movement member (71) is movable relative to the support member (70) in a movement direction (72) which is parallel to the opening direction (32) of the rubber stopper (2), and
 the movement member (71) extends into the drug container receptacle (5) for the displacement of the rubber stopper (2) such that part of the movement member (71) can be inserted into the drug container (3) through a communication hole (31) which is provided at drug container (3) apart from its regular opening (30) for enabling fluid communication of the interior of the drug container (3) and the exterior of the drug container (3).

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
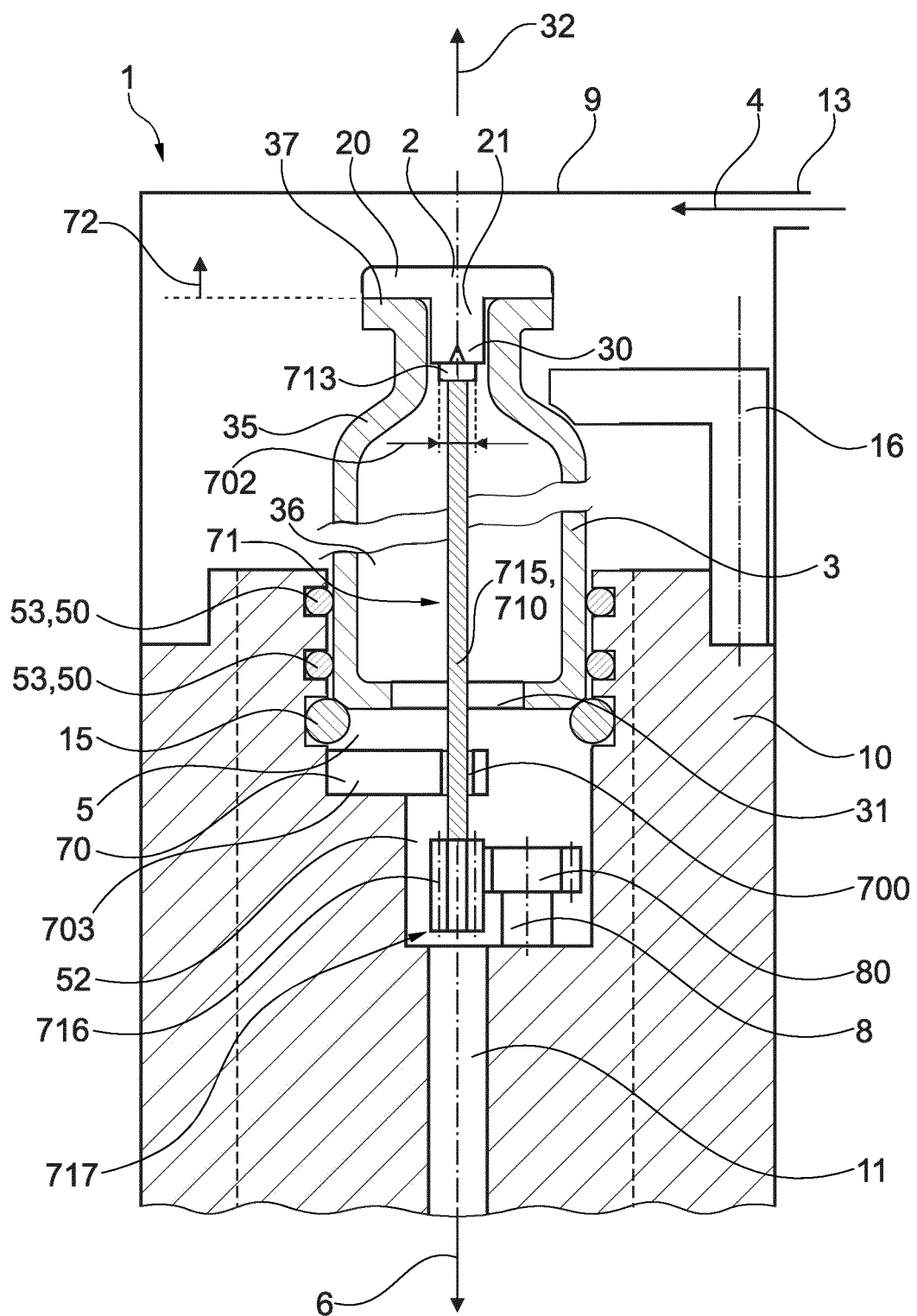
FIG. 1 is a schematic sectional view of a device for providing a displacement of a rubber stopper for leakage testing of a connection between the rubber stopper and a corresponding drug container according to an exemplary embodiment.

In the following, the invention will be explained in more detail with reference to the accompanying figures. In the figures, like elements are denoted by identical reference numerals and repeated description thereof may be omitted in order to avoid redundancies.

Preferably, the drug container (3) is a drug container (3) which can be used for storing drugs under sterile conditions and which is closed by the rubber stopper.

The drug container (3) can be a vial or a cartridge, preferably it is a vial.

Preferably, the drug container (3) is a non-pressurized container.

In FIG. 1, a schematic sectional view of a device (1) and of the device for providing a displacement of a rubber stopper for leakage testing of a connection between the rubber stopper (2) and a corresponding drug container (3) according to a first embodiment is shown.

The support member (70) supports the movement member (71). Preferably, the support member (70) and the displacement member (71) comprise complementarily formed threads (700, 710) engaging with each other, which are configured such that a rotation of the movement member (71) relative to the support member (70) results in a linear travel (73) of the movement member (71) relative to the support member (70) in the movement direction (72

By means of the engaging threads (700, 710), when rotating the movement member (71) relative to the support member (70), the movement member (71) performs a helical movement predetermined by the configuration of the threads (700, 710), in particular by the lead of the threads (700, 710), as will be described in more detail below.

Preferably, the support member (70) comprises an internal thread (700) and the movement member (71) comprises a threaded rod (715), the thread (710) of the threaded rod (715) is in engagement with the internal thread (700) of the support member (70).

In principle, the lead of the threads (700, 710) can be chosen with respect to the size of the drug container (3) and its rubber stopper (2), so for example the larger the drug container (3) and the rubber stopper (2), the larger the lead may be chosen; or for example the larger the possible linear travel (73), which can be realized with respect to the dimensions of the rubber stopper (2) and the regular opening (30), the larger the lead may be chosen. Another criteria to choose the lead can be a predetermined threshold value to which the lead must correspond, for example the lead can be the predetermined threshold value or the lead can be a fraction of the predetermined threshold value.

Preferably the lead of the threads (700, 715) is in the range of from 0.01 mm to 10 mm, more preferably of from 0.1 mm to 8 mm, even more preferably of from 0.2 mm to 8 mm.

In one embodiment for rather smaller drug containers, the lead is preferably of from 0.1 mm to 5 mm, more preferably from 0.2 to 4 mm, even more preferably from 0.2 to 3 mm, especially from 0.2 to 2 mm.

In another embodiment for rather larger drug containers, the lead is preferably of from 0.5 mm to 10 mm, more preferably from 0.75 to 8 mm, even more preferably from 1 to 6 mm.

In a specific embodiment the lead is 1 mm.

The "lead" is to be understood as the rise, that is as the linear travel (73) the movement member (71) makes per revolution about 360° relative to the support member (70).

A communication hole (31) is provided at the bottom of the drug container (3). The movement member (71) extends into the drug container receptacle (5) for the displacement of the rubber stopper (2) such that part of the movement member (71) can be inserted into the drug container (3) through a communication hole (31) which is provided at drug container (3) apart from its regular opening (30) for enabling fluid communication of the interior of the drug container (3) and the exterior of the drug container (3).

Preferably, the communication hole (31) comprises an extension such that at least the threaded rod (715) of the movement member (71), or the threaded rod (715) and the support member (70), can be inserted at least in an insertion direction by using an insertion orientation of the threaded rod (715) and/or of the support member (70).

Preferably, the movement member (71) contains a collar section (713) for making contact with an insertion section (21) of the rubber stopper (2).

Preferably, the collar section (713) is arranged at an end of the threaded rod (715), wherein preferably, the collar section (713) is rotatably connected to the threaded rod (715).

To allow pushing the insertion section (21) through the opening (30), the collar section (713) comprises a diameter (702) smaller than the inner diameter of the opening (30) of the drug container (3) which is intended to be tested via the device (1).

The collar section (713) can also have a form different from a circular shape, as long as the maximum lateral extension, that is the diameter (702), of the collar section (713) is smaller than the inner diameter of the opening (30).

The dimension of the device (1) and of its members are adapted and chosen according to the dimensions of the drug container (3) and the rubber stopper (2) corresponding to the drug container (3) as explained herein.

In case that the drug container (3) is a vial, typical dimensions of vials are known to the skilled person and are for example as stated in Table 10.

TABLE 10

| Size designation of vial | d1 [mm] | d2 [mm] |
|---|---|---|
| 2 R | 16 | 13 |
| 6 R | 22 | 20 |
| 20 R | 30 | 20 | d1: outer Diameter of the body of the vial
d2: maximum diameter of the neck portion (33) of the vial Preferably, the communication opening (31) is in form of a hole or of a slot.

The communication opening (31) may be arranged at the bottom of the drug container (3); also the whole bottom of the drug container (3) can be cut off to provide said communication opening (31). This communication opening (31) is an artificial opening that was introduced into the drug container (3) only for the purpose of testing the container closure integrity.

In the exemplary embodiment displayed in FIG. 1, the drug container (3) is provided in form of a vial.

Preferably, the device (1) can further comprise a test medium supply (13) for exposing a connection region of the drug container (3) and the rubber stopper (2) to a test medium, this exposure can be done from the exterior or from the interior (36) of the drug container (3).

The test medium may be but is not limited to a test gas, preferably the test gas is a rare gas such as helium or argon, or hydrogen, more preferably the test gas is helium.

Furthermore, the device (1) can comprise a detection unit (6) for detecting the presence of test medium that has passed through the regular opening (30) of the drug container (3) due to a leakage between the connection of the rubber stopper (2) and the drug container (3).

In this exemplary embodiment, the detection unit (6) is configured to detect test medium which has passed through the regular opening into the interior (36) of the drug container (3). Therefore, the detection unit (6) may be in fluid communication with the interior (36) via communication opening (31). The fluid communication may be preferably provided by a connection channel (11) extending in an optional main body (10) of the device (1) from the drug container receptacle (5) towards the detection unit (6).

Preferably, the detection unit (6) comprises a mass spectrometer.

Drug container receptacle (5) may optionally comprise one or more sealings (50) for sealing the connection channel (11) and/or a receptacle chamber (52) against the exterior of the device (1) when the drug container (3) is correctly inserted into the drug container receptacle (5). Preferably, one or more guidings (53), preferably guide rings, are arranged in the drug container receptacle (5) for guiding the drug container (3) with respect to the receptacle (5). In a preferred embodiment, the sealings (50) may also provide guiding of the drug container (3), more preferably the sealings (50) may be identical with the guidings (53).

The one or more sealings (50) may divide the device (1) and the drug container receptacle (5) into an upstream portion, which is above the one or more sealings (50) and into a downstream portion, which is below the sealings (50). Preferably, thereby, the receptacle chamber (52) of the drug container receptacle (5) being in fluid communication with the connection channel (11) may be formed by the lower or inner part of the receptacle (5), one of the one or more sealings (50) and the wall of the drug container (3).

Device (1) can comprise a travel determining unit. For determining and/or acquiring the linear travel (73) of the movement member (71) relative to the support member (70), The linear travel (73) of the movement member (71) relative to the support member (70) may be determined and/or acquired by means of detecting a cumulated angle of rotation of the movement member (71) relative to the support member (70). According to an exemplary embodiment, in this regard, the travel determining unit may comprise an encoder, preferably an absolute encoder.

Furthermore, a positioning unit (15) may optionally be provided in the drug container receptacle (5) for providing a stop position defining a maximum insertion depth of the drug container (3) into the drug container receptacle (5). Preferably, the positioning unit may be arranged to prevent closing of the connection channel (11) by the drug container (3) and/or the rubber stopper (2).

In some embodiments of the invention the one or more sealings (50), the one or more guidings (53), and/or a portion of an inner wall of the drug container receptacle (5) may be adapted to function as the positioning unit (15). Alternatively, the sealings (50), and/or the guidings (53) may be provided separate to positioning unit (15).

In some embodiments, the positioning unit (15) is a part which is removable from the device and can be placed on the drug container (3).

According to yet another embodiment, the one or more guidings (53) and/or the positioning unit (15) may be part of the device (1), wherein preferably, the device (1) comprises a guiding section forming the guiding and/or a positioning section forming the positioning unit (15), wherein preferably, the positioning section and/or the guiding section may be formed integrally with the device (1), preferably with the support member (70) and/or the movement member (71).

In some embodiments, the sealing (50), the guiding and/or the positioning unit may comprise an O-Ring.

According to a further embodiment, the device (1) may comprise an adaptor which is compatible with a common leak detection system. In particular, the adaptor might be a flange or a ring.

Alternatively or in addition, the optionally provided sealing (50), guiding and/or positioning unit may be made of a flexible material, preferably a material selected from an elastomer, such as rubber, latex, or silicone.

Preferably, the support member (70) comprises a support section (703).

Preferably, the support member (70) can be attached and/or fixed to a main body (10) of a device (1) for leakage testing as described below by means of the support section (703).

Alternatively, the support member (70) is adapted for supporting the device (1) against the drug container (3), as will be described in more detail with respect to FIGS. 3 to 11 below.

Moreover, the device (1) may comprise an optional down-holding unit (16), which preferably is detachable and which may exert a force onto the drug container (3) in direction of the positioning unit (15), preferably by means of biasing the displacement unit. Thereby, the drug container (3) may be held in position with respect to the main body (10). Preferably, the drug container (3) can be fixed in its position with regard to the main body (10) by means of the positioning unit (15) and the down-holding unit (16).

Preferably, the positioning unit (15), preferably in combination with the down-holding unit (16), prevents a repositioning of the container (3) even when a pressure difference is applied.

Preferably, the down holding unit (16) is adapted to be attached and/or to contact a shoulder (35) of the drug container (3).

Preferably, the device (1) further comprises a housing (9) which provides a chamber into which test medium indicated via reference sign (4) may be introduced from a test medium supply (13). The housing (9) is preferably removable. Preferably, the housing (9) comprises in addition an outlet (not shown) for pressure control inside the chamber provided by the housing (9).

Device (1) may comprise a movement unit (8) for moving the movement member (71) in the moving direction (72).

The movement unit (8) may comprise a gear wheel (80) which is in engagement with a plurality of radially outwards extending teeth (716) distributed in a circumferential direction at an engagement section (717) of the movement member (71).

Preferably, the plurality of radially outwards extending teeth (716) is distributed evenly in a circumferential direction at the engagement section (717).

Preferably, the engagement section (717) is arranged at the end of the threaded rod (715) opposite to the end at which the collar section (713) is arranged.

Preferably, the gear wheel (80) comprises a width greater than a maximum linear travel (73) of the movement member (71), and/or the engagement section (717) comprises a width greater than a maximum linear travel (73) of the movement member (71), as shown in FIG. 1.

The movement unit (8) may comprise an actuator for moving the movement member (71) or the support member (70), respectively, in the moving direction (72).

Preferably, the actuator is an electric servomotor and/or a stepper motor.

The movement unit (8) may further comprise an encoder for detecting an angular position and/or the cumulated angle of rotation of the movement member (71) and/or the movement unit 8, preferably the gear wheel (80).

Preferably, the encoder is an absolute encoder.

Further subject of the invention is a method for providing a displacement of a rubber stopper (2) for leakage testing of a connection between a rubber stopper (2) and a corresponding drug container (3), comprising
  a) providing a device (1) according to the invention as defined herein, also with all of its embodiments,
  b) providing a drug container (3) with a communication opening (31) for enabling fluid communication of an exterior of the drug container (3) with the interior (36) of the drug container (3) apart from its regular opening (30),
  c) closing the regular opening (30) of the drug container (3) with the rubber stopper (2),
  d) inserting the drug container (3) into the drug container receptacle (50) of the device (1),
  e) exposing either the exterior of the drug container (3) or, alternatively, the interior (36) of the drug container (3) at least at a connection region of the drug container (3) and the rubber stopper (2) inserted into the regular opening (30) of the drug container (3) to a test medium, and
  f) displacing the rubber stopper (2) relative to the drug container (3) in an opening direction (32) for a chosen distance while measuring any presence of the test medium either in the interior (36) or, alternatively, in the exterior of the drug container (3) that has passed through the regular opening (30), wherein
  g) the rubber stopper (2) is displaced relative to the drug container (3) by means of the movement member (71).

In one embodiment of the invention, the interior (36) of the drug container (3) is filled with test medium.

In another embodiment of the invention, the exterior around the rubber stopper (2) comprises test medium. In this case the exterior around the rubber stopper (2) can be placed in the interior of a container or a housing (9) which is filled with test medium.

The chosen distance can be any chosen distance, for example a predetermined threshold distance, or a distance until presence of the test medium either in the interior (36) or, alternatively, in the exterior of the drug container (3) passed through the regular opening (30) is detected.

Preferably, at least the threaded rod (715) of the device (1) is partially inserted into the drug container (3) through the communication opening (31). In addition, parts or all of the support member (70) and/or further parts or all of the movement member (71) besides the threaded rod (715) can be inserted into the drug container (3) through the communication opening (31). Said insertion is done at least in a predetermined insertion direction by using a predetermined insertion orientation of the threaded rod (715) and/or of the support member (70) and/or of the movement member (71) and/or their respective parts.

After having at least partially inserted the threaded rod (715) into the drug container (3) and after having closed the regular opening (30) with the rubber stopper (2), the movement member (71) may be rotated relative to the support member (70). Thereby the rubber stopper (2) is displaced in the opening direction (32).

Figure 3:
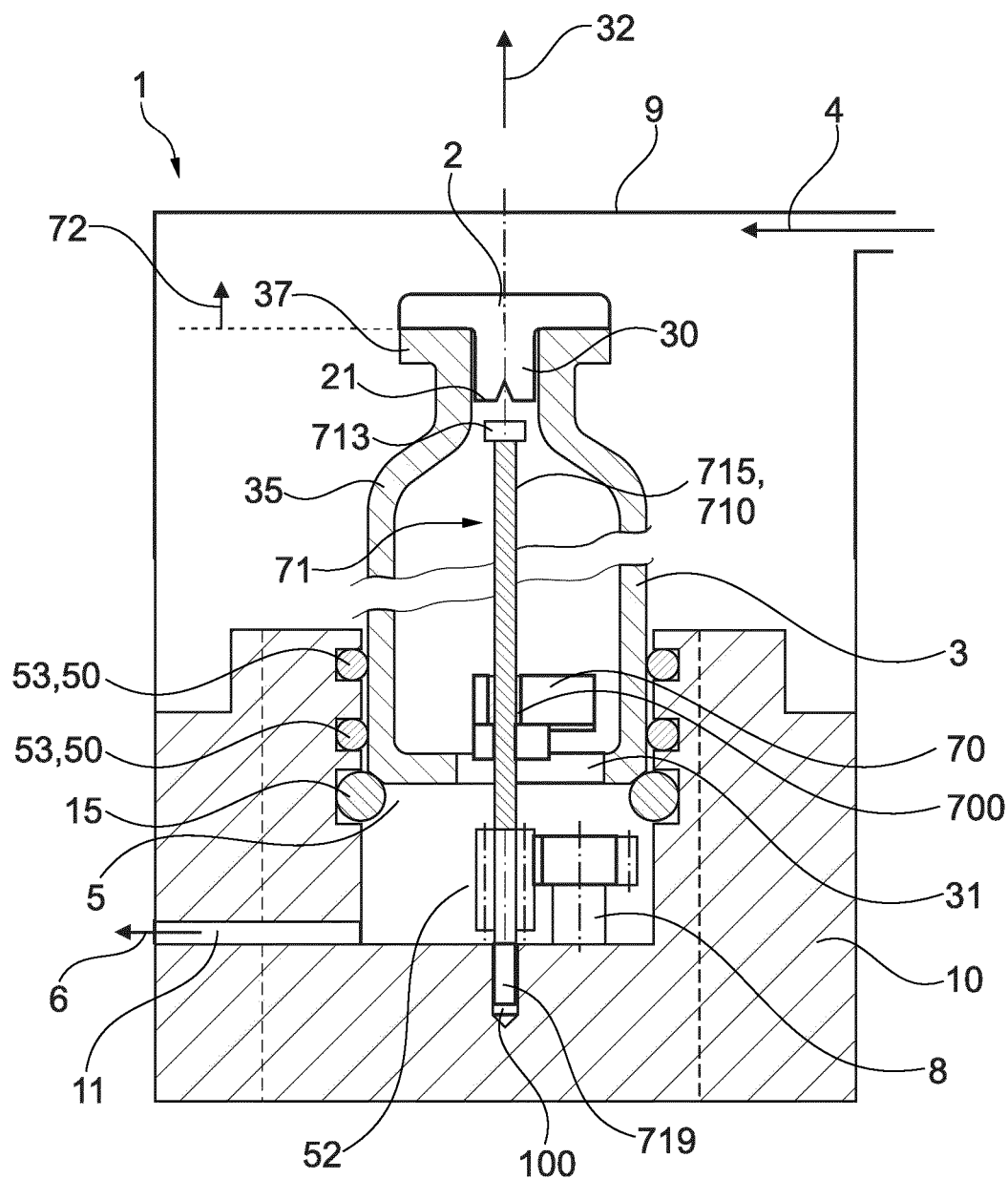
FIG. 3 is a schematic sectional view of a device for providing a displacement of a rubber stopper for leakage testing of a connection between the rubber stopper and a corresponding drug container according to a further embodiment.

Preferably, the support member (70) and the movement member (71) are arranged in a screwed-in position relative to each other as shown in e.g. FIG. 3. This preferably is be done before partial insertion of the movement member (71) into the drug container (3). Preferably, the movement member (71) and the support member (70) of device (1) are dimensioned in such a way that in the screwed-in position, the movement member (71), in particular the end face of the collar section (713) of the threaded rod (715) is separated from the end face of the insertion section (21) of the rubber stopper (2) by a certain preferably predefined distance as shown in FIG. 3.

Prior or subsequent to partially inserting the movement member (71) of the device (1) into the drug container (3) through communication opening (31) as described above, the regular opening (30) is closed with the rubber stopper (2) by insertion of the rubber stopper (2) into the regular opening (30) until the collar (20) of the rubber stopper (2) makes contact with the neck portion (33) of the drug container (3). As the movement member (71) of the device (1) is inserted though communication opening (31), hence, the rubber stopper (2) can be completely inserted into the regular opening (30) such that its collar (20) is in contact with collar (37) of the drug container (3).

For reaching an initial position, the movement member (71) may be rotated relative to the support member (70) so that the movement member (71), in particular the end face of the collar section (713) of the threaded rod (715), just makes contact with the end face of the insertion section (21) of the rubber stopper (2) without moving the rubber stopper (2). This reaching of the initial position can already be done while the connection region of the drug container (3) and the rubber stopper (2) is exposed to the test medium.

In FIG. 1, the above described initial position is shown.

Now, exposure of the connection region of the drug container (3) and the rubber stopper (2) to the test medium and monitoring whether test medium passes through regular opening (30) may be started if said exposure had not already been started before or during the reaching of the initial position. Then, the movement member (71) may be rotated relative to the support member (70) preferably while detecting the cumulated angle of rotation of the movement member (71) relative to the support member (70), preferably starting from the initial position. With other words, the cumulated angle of rotation is set to zero at the beginning, preferably at the initial position, and the cumulated angle is a sum of the rotation the movement member (71) performs via its helical movement relative to the support member (70).

During the rotation of the moving member (71) against the support member (70) the ongoing monitoring for test medium that may pass through the regular opening (30) will reveal for example whether a leakage has occurred until the predetermined threshold distance has been reached, or, alternatively, the distance is determined until passing of the test medium (4) through the regular opening (30) occurs.

Therefore the method may further comprise acquiring the linear travel (73) of the rubber stopper (2) or of the movement member (71), respectively, by means of detecting the cumulated angle of rotation in combination with the lead of the threads (700, 715).

Preferably the linear travel (73) of the movement member (71) starting from the initial position is acquired by multiplication of the detected cumulated angle of rotation by the lead of the threads (700, 715), the latter having the unit "travel per degree of rotation", preferably mm/360°. Hence, the helical movement may be divided in a rotational movement about an axis parallel to the opening direction (32), and a linear travel (73) parallel to the opening direction (32). It is also possible that said linear travel be detected directly by a respective detecting device preferably being in communication with and/or integrated in the travel determining unit.

A predetermined threshold travel in the opening direction (32) of the rubber stopper (2) from a position in which the collar (20) makes contact with the collar (37) can be set for example by regulatory authorities that set standards for CCI. The method of instant invention allows for testing the CCI in case of displacement of the rubber stopper (2) by a predetermined threshold travel smaller than the maximum possible linear travel (73) of the movement member (71) starting from the initial position. As the linear travel 73 is defined herein as the travel distance of the rubber stopper (2) starting from the initial position, it corresponds to the linear travel (73) of the movement member (71) starting from the initial position. Hence, the linear travel (73) of the movement member (71) may be used for comparison with the predetermined threshold travel of the rubber stopper (2).

Furthermore, a boundary travel may be determined as being the linear travel (73) at which test medium (4) having passed through the regular opening (30) is detected for the first time.

Optionally, the boundary travel may then be compared to a predetermined threshold travel in order to determine whether the boundary travel is smaller, equal or greater than the predetermined threshold travel. Or optionally the linear travel (73) can also be stopped when the predetermined threshold travel is reached in case that no presence of the test medium (4) has been detected having passed through the regular opening (30) until the predetermined threshold travel has been reached.

So the boundary travel shall be greater than the predetermined threshold travel for positive evaluation of the connection of the tested combination of drug container (3) and rubber stopper (2), that is for positive evaluation of CCI. For example, the predetermined threshold travel may have been set to 1 mm so the boundary travel shall be greater than 1 mm for positive evaluation of CCI. According to an exemplary lead of 1 mm per 360° of rotation, hence, the movement member (71) at least has to be rotated about 1.0 revolutions without detection of test medium for a positive result of CCI.

Hence, by detection of the angle of rotation as described above, a simple and precise detection of the linear travel 73 may be achieved.

Figure 2:
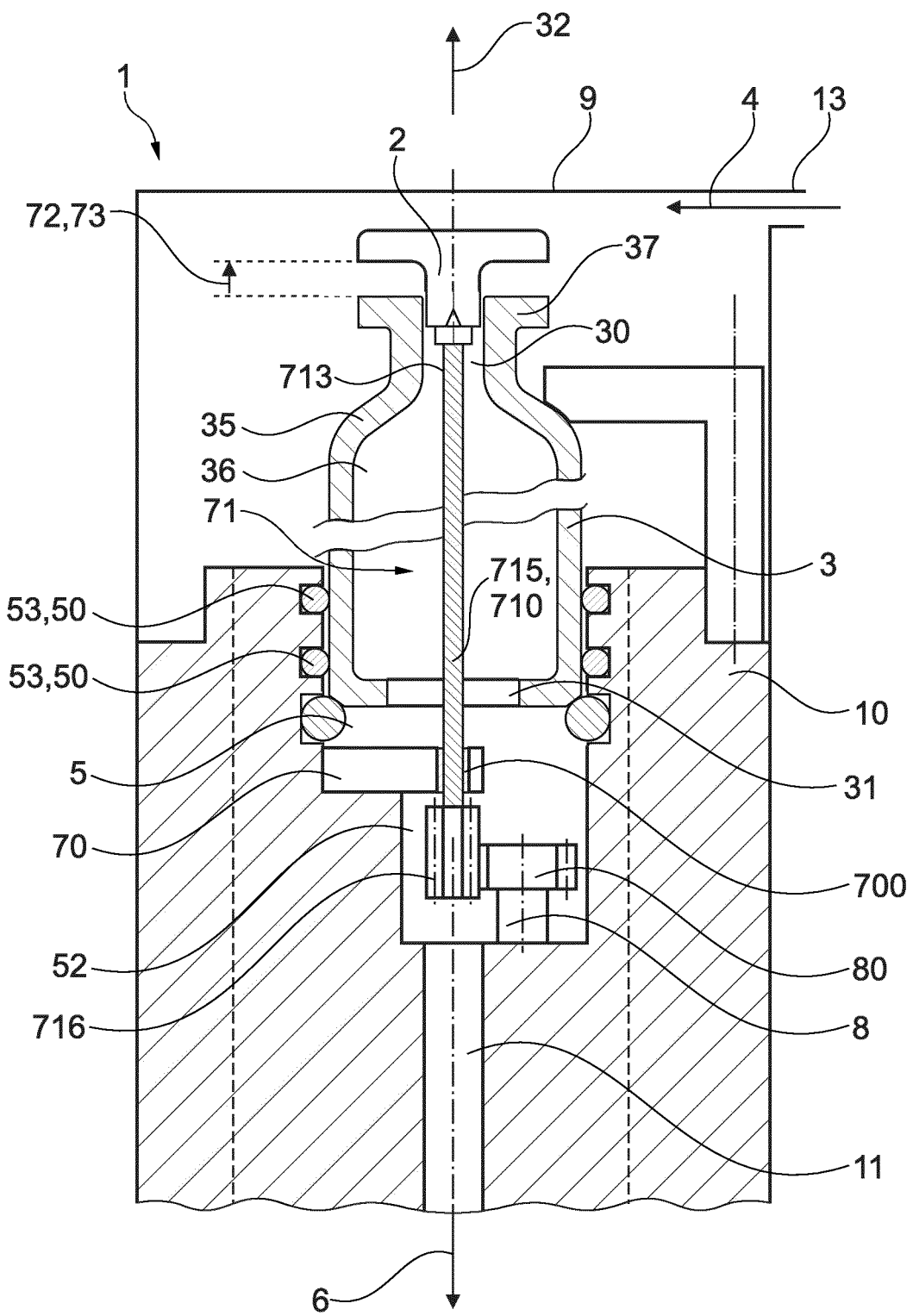
FIG. 2 is another schematic sectional view of the device of FIG. 1.

FIG. 2 shows a position of the rubber stopper (2) at which test medium has been detected by the detection device (6). As can be seen, the rubber stopper (2) has been moved by the movement member (71) in the movement direction (72), which corresponds to the opening direction (32), by an amount of the linear travel (73).

Preferably, for the leakage testing of a connection between a rubber stopper (2) and a corresponding drug container (3), the drug container (3) is inserted into the drug container receptacle (5) of device (1), with device (1) as defined herein, also with all its embodiments.

Depending on the embodiment of device (1) and obviously on the embodiment of the method for leakage testing, the device (1) can be configured in such a way the drug container (3) is inserted into the drug container receptacle (5) in an upright position, that is with the bottom of the drug container (3) first, as displayed exemplary in FIG. 1. In this case preferably the exterior of the drug container (3) at least at a connection region of the drug container (3) and the rubber stopper (2) inserted into the regular opening (30) of the drug container (3) is exposed to test medium (4).

Figure 10:
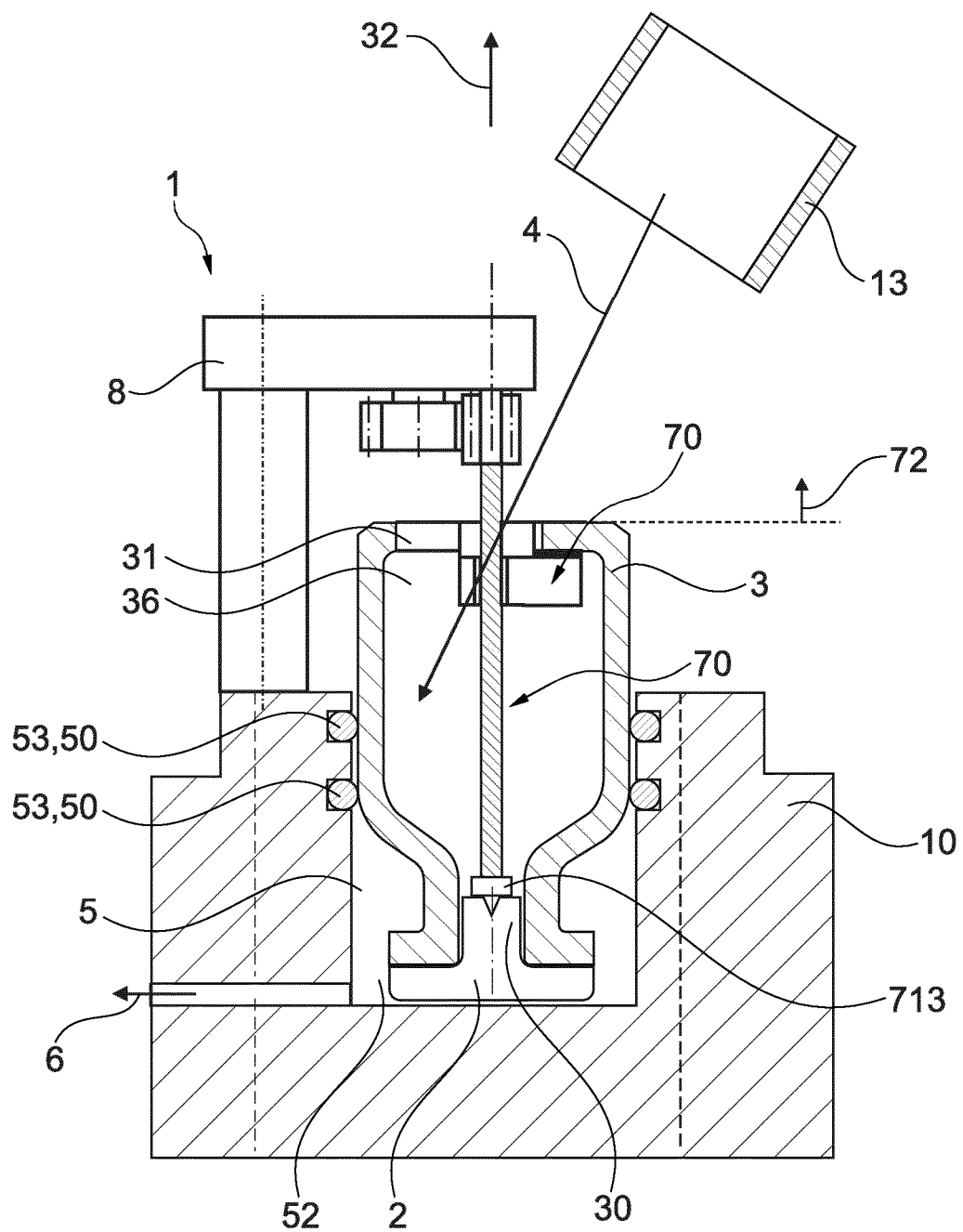
FIG. 10 is a schematic sectional view of a device for providing a displacement of a rubber stopper for leakage testing of a connection between the rubber stopper and a corresponding drug container according to a further embodiment.
Figure 11:
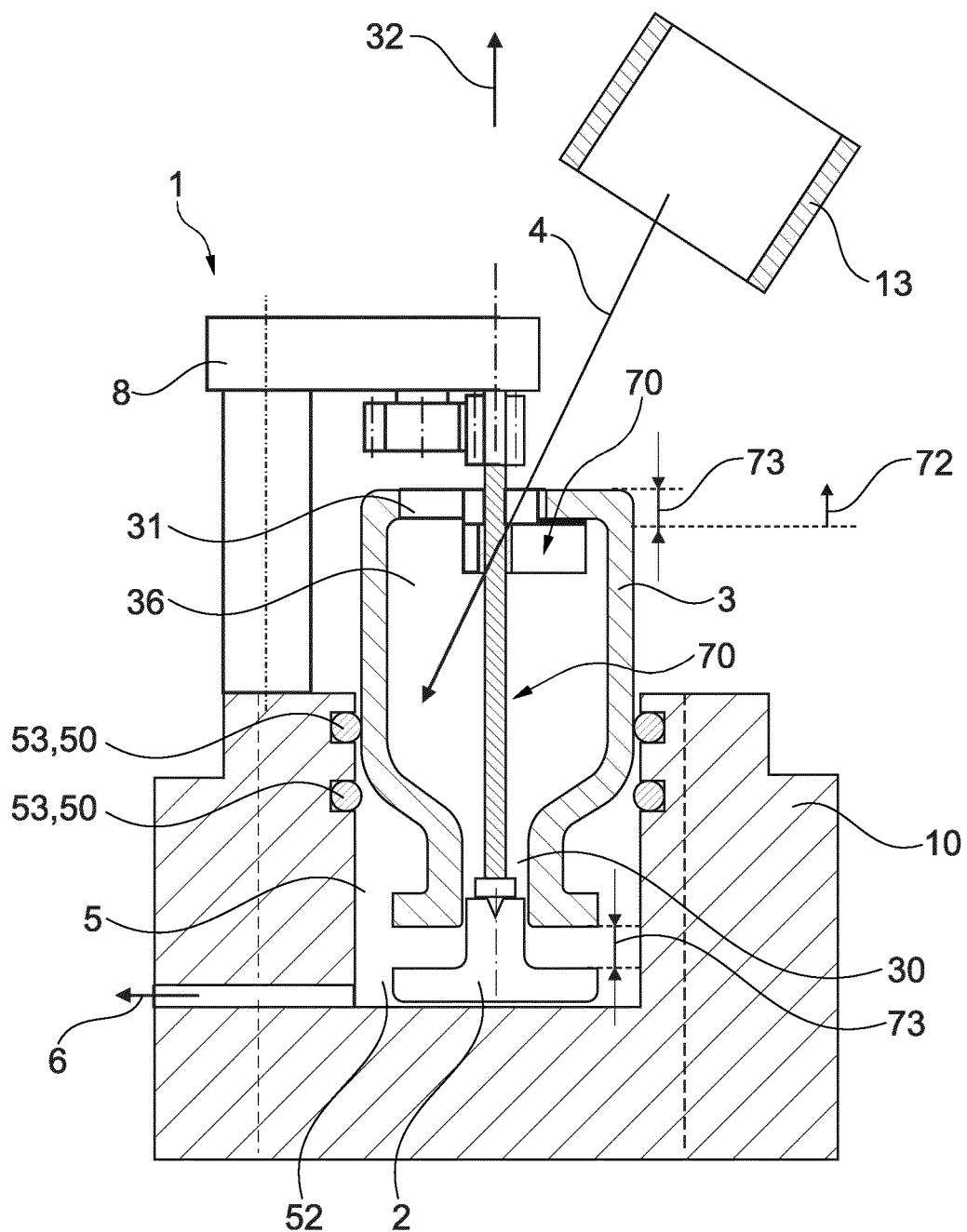
FIG. 11 is another sectional view of the device of FIG. 10.

In another embodiment of device (1) and obviously of the method for leakage testing, the device (1) can be configured in such a way the drug container (3) is inserted into the drug container receptacle (5) head on, that is with the neck portion (33) first, as displayed exemplary in FIGS. 10 and 11. In this case preferably the interior (36) of the drug container (3) at least at a connection region of the drug container (3) and the rubber stopper (2) inserted into the regular opening (30) of the drug container (3) is exposed to test medium (4), In both cases, whether the drug container (3) is inserted into the drug container receptacle (5) bottom first or head on, any test medium passing through the regular opening (30), that is in case of the leakage testing by way of a leakage between the rubber stopper (2) and the drug container (3), is passing preferably through the drug container receptacle (5), in particular through the receptacle chamber (52); preferably leaving the device (1) through the connection channel (11) and is preferably detected by the detection unit (6).

FIG. 3 is a schematic sectional view of a device (1) for leakage testing of a connection between a rubber stopper (2) and a corresponding drug container (3) according to another embodiment. The device (1) in large part corresponds to the device (1) shown in FIG. 1. In this embodiment, contrary to FIG. 1, the threaded rod (715) and the support member (70) are inserted into the drug container (3) by using a predetermined insertion orientation of the threaded rod (715) and in particular of the support member (70) as shown in this figure.

As can be seen, the support member (70) comprises an insertion orientation, here facing to the right with respect to the orientation of device (1) in FIG. 3. The communication opening (31) comprises an extension such that, in the insertion orientation, the support member (70) can be inserted into the drug container (3) by pushing the drug container (3) into the drug container receptacle (5) until the drug container (3) abuts against the positioning unit (15).

With other words, in this embodiment, the support member (70) is merely attached to the threaded rod (715) of the movement member (71) via thread (700) but is not connected to the main body (10).

Preferably, movement member (71) is positioned via engagement of an alignment section (719), which is here optionally formed as an alignment pin, of the movement member (71) with a positioning section (100) of the main body (10), here formed as optional positioning hole.

According to this exemplary embodiment, the support member (70) is adapted and formed for being engaged with the drug container (3). By means of this engagement, the device (1) is supported against the drug container (3).

In this regard, the support member (70) has to be brought into a engaging position with respect to the drug container (3). As a first step after insertion of the drug container (3) in the insertion orientation, the movement member (71) has to be rotated. As the support member (70) is only engaged with the threaded rod (715), by rotation of the same, also the support member (70) is correspondingly rotated.

Preferably, the threads (700, 715) are formed as self-locking threads to ensure rotation of the support member (70) when moving the movement member (71).

Figure 4:
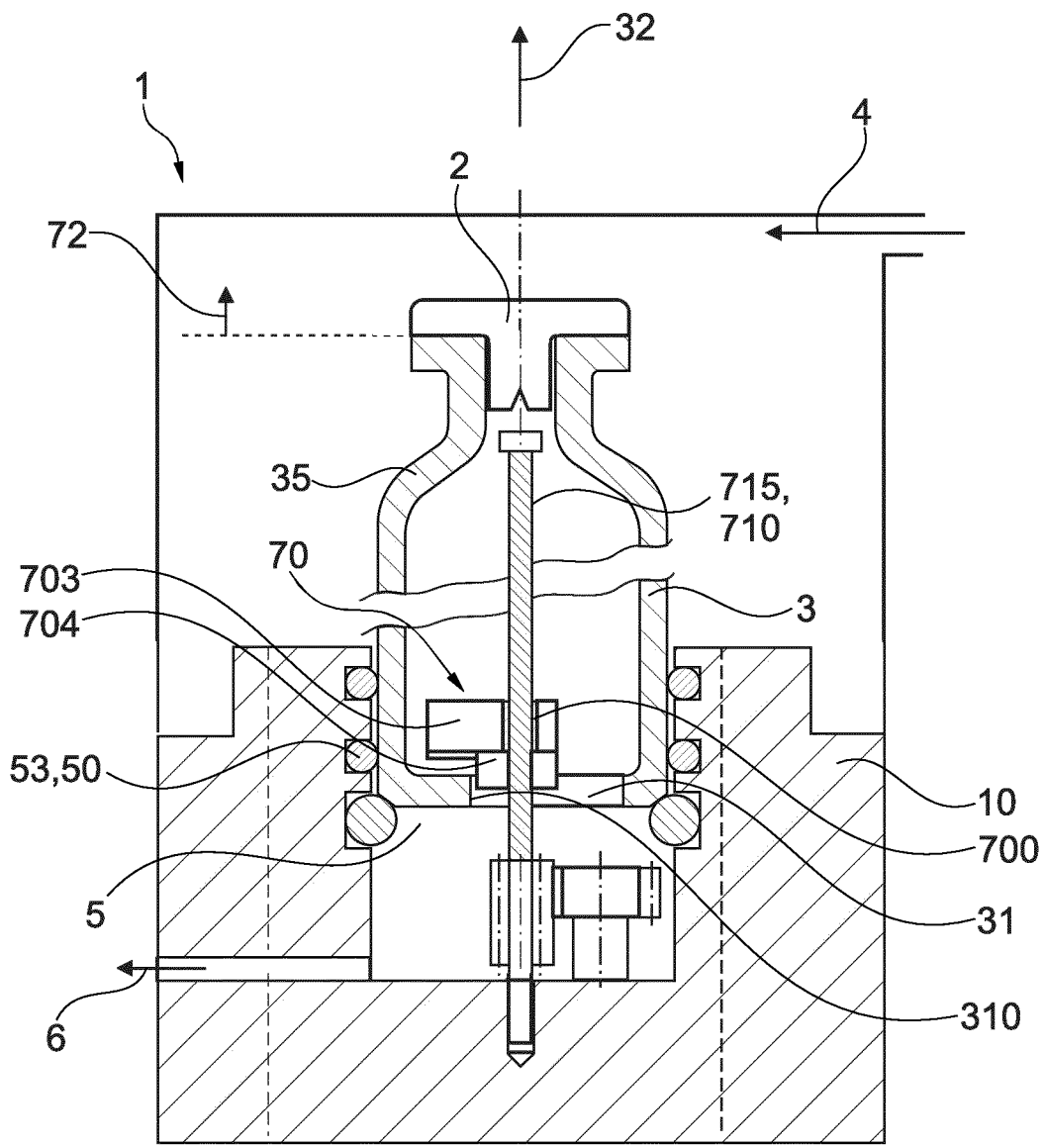
FIG. 4 is another schematic sectional view of the device of FIG. 3.

The support member (70) is rotated until an abutment section (704) abuts against an inner wall (310) of the communication opening (31) as shown in FIG. 4.

Figure 5:
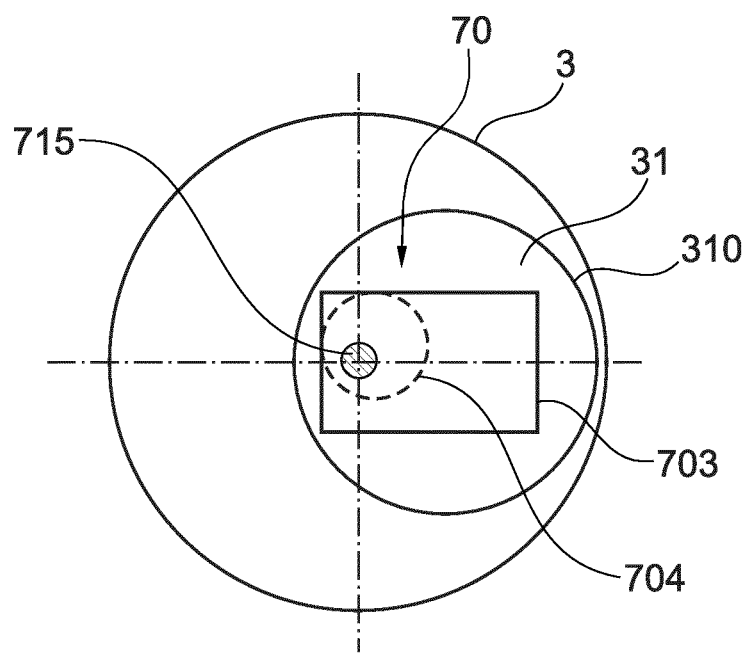
FIG. 5 is a schematic sectional view through the drug container of FIG. 3 perpendicular to an opening direction.

The latter can be achieved as the abutment section (704) is arranged eccentrically to the threaded rod (715), that is the longitudinal axis of the threaded rod (715), as can be seen in FIG. 5, which shows a schematic sectional view through the drug container (3) perpendicular to the opening direction (32), hence to the longitudinal axis of the threaded rod (715).

In FIG. 5, the support member (70) is positioned in the insertion orientation as shown in FIG. 3. Here, the eccentric abutment section (704) is distanced from the inner wall (310) of communication opening (31).

Figure 6:
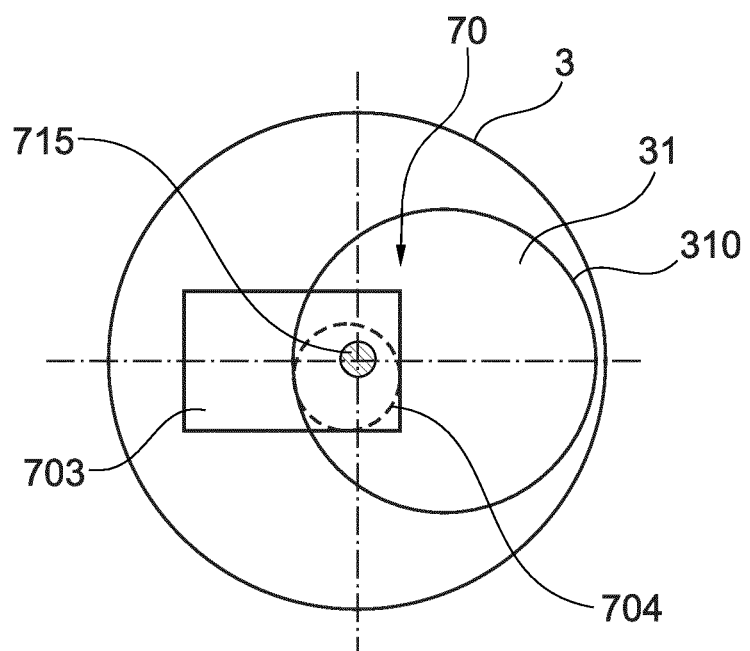
FIG. 6 is a schematic sectional view through the drug container of FIG. 4 perpendicular to an opening direction.
Figure 7:
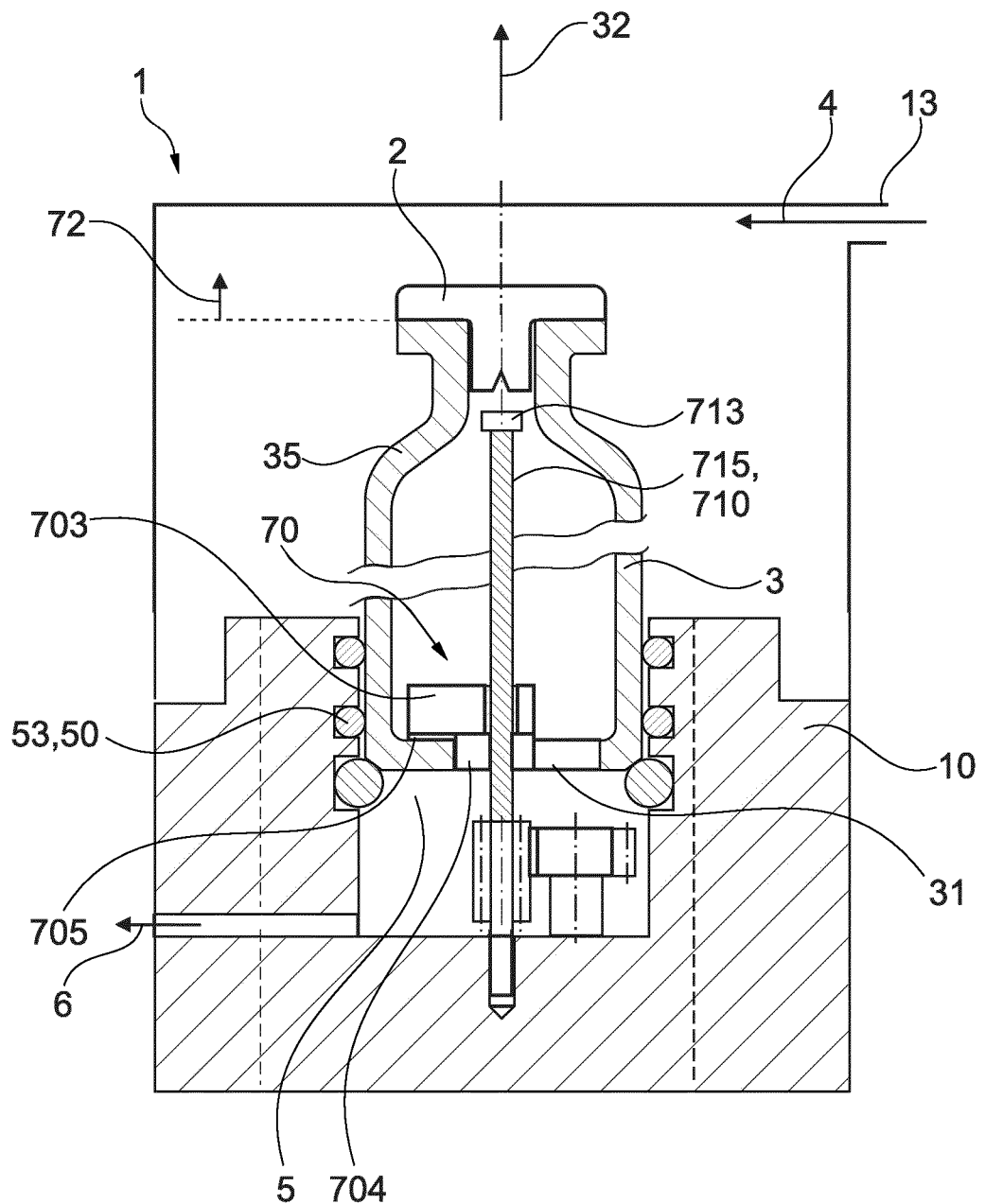
FIG. 7 is another schematic sectional view of the device of FIG. 3.

FIG. 6 schematically shows a further sectional view which substantially corresponds to FIG. 5, wherein here the support member (70) is oriented as shown in FIG. 4. By rotation of the threaded rod (715) and hence the support member (70), the abutment section (704) made contact with the inner wall (310). Hence, by further rotation of the threaded rod (715), the support member (70) moves downwards, that is against the movement direction 72, until a support section (703) of the support member (70) makes contact with the drug container (3), as shown in FIG. 7.

Figure 8:
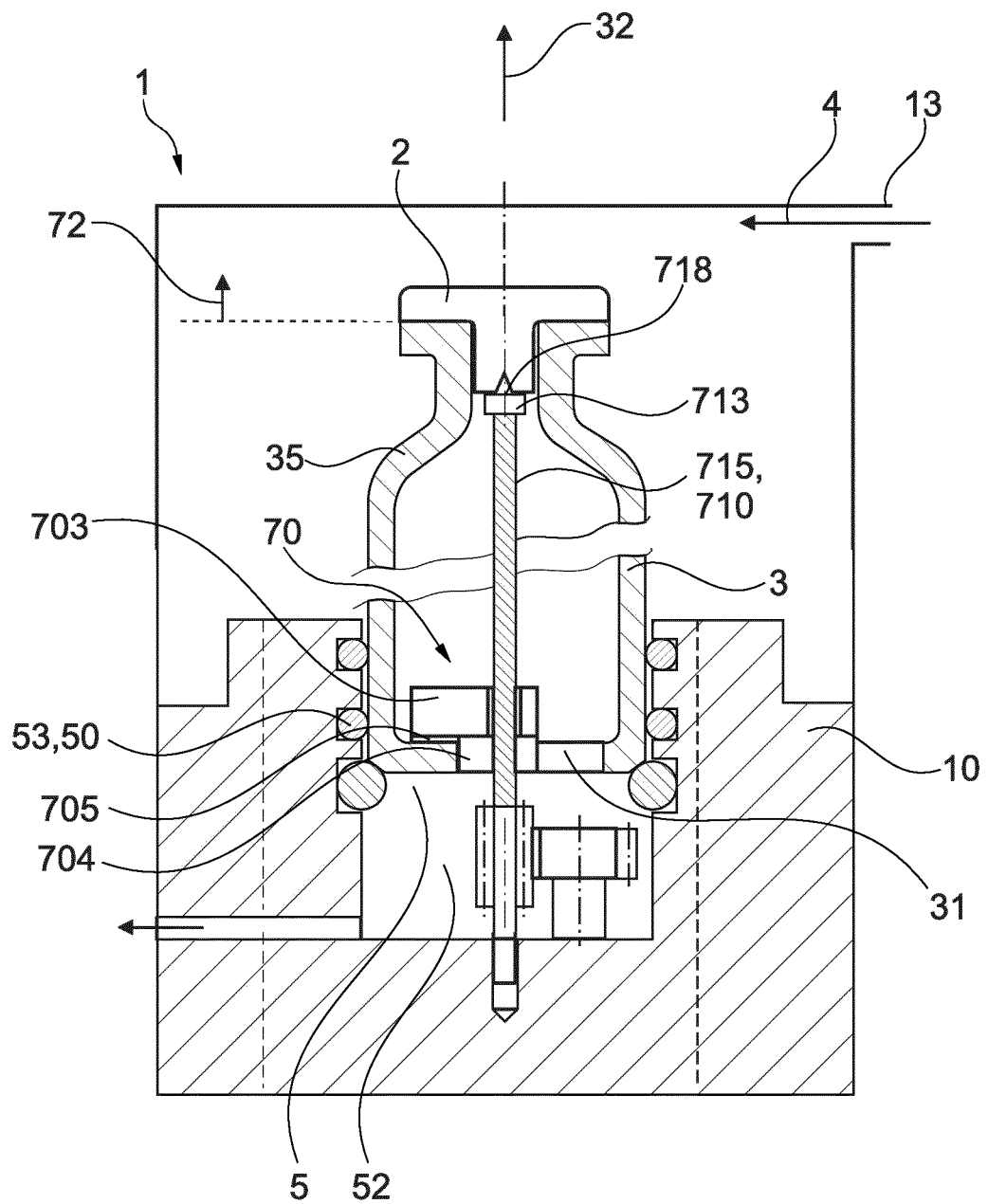
FIG. 8 is another schematic sectional view of the device of FIG. 3.

Further rotation of the movement member (71) now causes to a displacement of the movement member (71) in the movement direction (72) until the collar section (713) makes contact with the end surface of the insertion section (21) of the rubber stopper (2), as can be taken from FIG. 8.

This position, as shown in FIG. 8, constitutes the initial position according to this exemplary embodiment. Further rotation of the movement member (71) results in a displacement of the rubber stopper (2) in the movement direction (72), hence, causes linear travel (73) of the rubber stopper (2).

Figure 9:
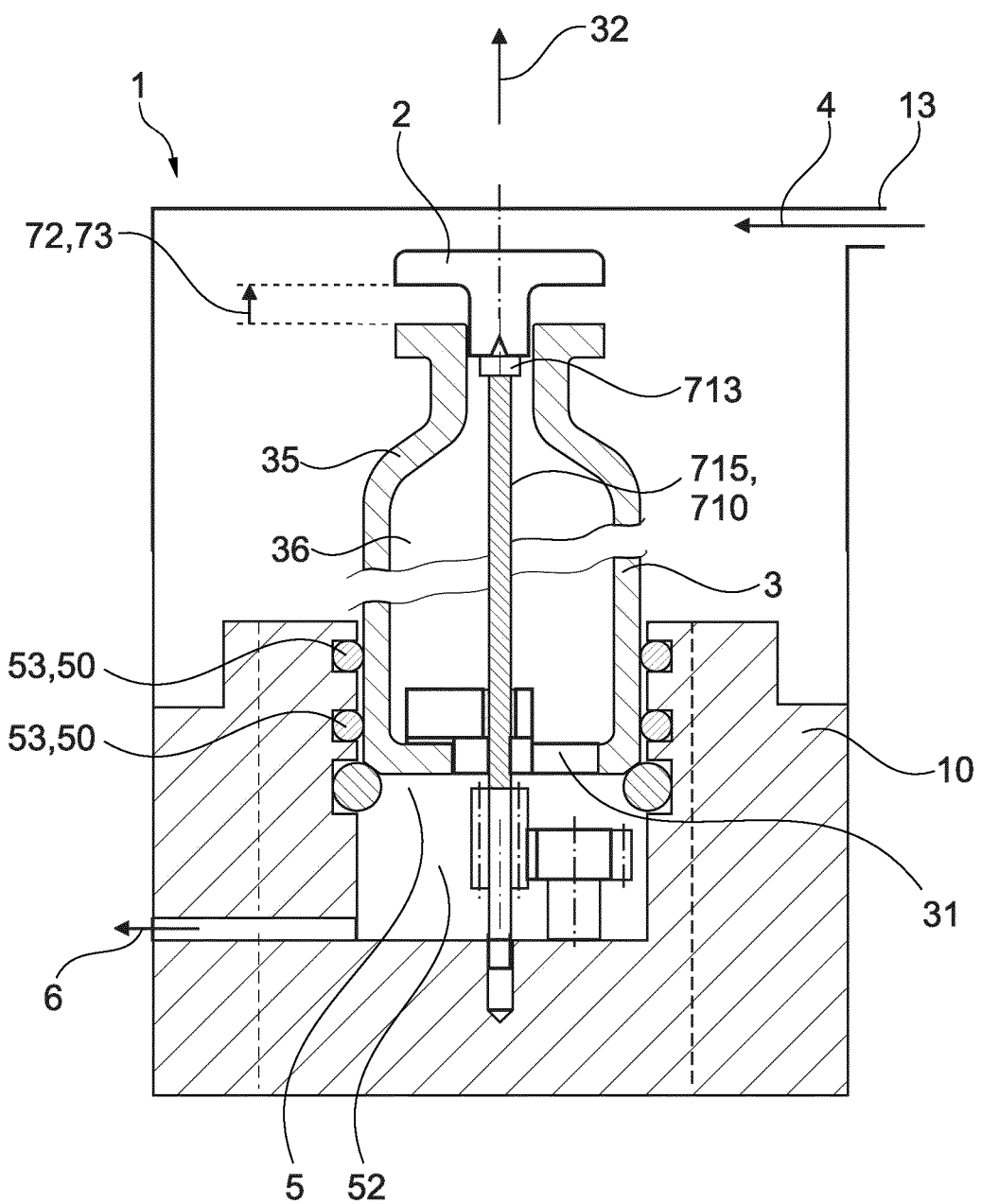
FIG. 9 is another schematic sectional view of the device of FIG. 3.

In FIG. 9, a further sectional view of the device shown in FIGS. 3 to 8 is shown, in which the rubber stopper (2) has reached the boundary travel at which test medium (4) has been detected for the first time via detection unit (6).

FIG. 10 is a schematic sectional view of a device (1) for leakage testing of a connection between a rubber stopper (2) and a corresponding drug container (3) according to another embodiment. Here, the drug container (3) is inserted with its neck portion (33) into the drug container receptacle (5), with the neck portion (33) facing the bottom of drug container receptacle (5). Device (1) has a substantially similar setup as described with regard to FIGS. 3 to 9.

Here, first, the drug container (3) having its regular opening (30) sealed via the rubber stopper (2) can be inserted head on into the drug container receptacle (5) until the rubber stopper (2) abuts against the bottom of the drug container receptacle (5).

In a subsequent step, the displacement device 7 can be inserted into the communication opening (31) analogously but with vice versa direction to the description with regard to FIG. 3.

Next, contact of the support member (70) via support section (703) with the drug container (3) may be established analogously to as described with regard to FIGS. 4 to 9.

Thereby, the device (1) comprises the initial position being the position as shown in FIG. 10.

Preferably, a detachable movement unit 8 may be provided, which in addition may provide positioning and/or alignment of the movement member (71) with regard to a least a radial orientation with respect to the opening direction 32, that is to the longitudinal axis of the main body (10).

The movement unit (8) may be part of the device (1) or may be provided as a separate part.

Here, the optional test medium supply (13) is adapted to fill test medium (4) into the interior (36) of the drug container (3) via the communication opening (31).

FIG. 11 schematically shows another sectional view of the device of FIG. 10, wherein the movement member (71) has been rotated with respect to the support member (70) such that the support member (70) has been displaced in the movement direction (72). Thereby, the support member (70) has shifted up the drug container (3) in the movement direction (72). As the movement member (71) pressed the rubber stopper (2) downwards, the rubber stopper (2) and the drug container (3) have been displaced to each other by linear travel 73.

Again, leakage testing can be performed as described with respect to the previous embodiments.

With other words, in this exemplary embodiment, again, the movement member (71) is displaced relative to the support member (70) by rotation of the movement member (71). As the rubber stopper (2) rests on the bottom of the drug container receptacle (5), by rotation of the movement member (71), the support member (70) and hence the drug container (3) is displaced relative to the rubber stopper (2).

The device (1) also may preferably comprise a test medium supply (13) and/or a housing (9).

When leakage at the connection of regular opening (30) and rubber stopper (2) occurs, test medium can flow from the interior 36 of drug container (3) to the connection channel (11) and further on to the detection unit 6.

The collar section (713) may contain a contact area (718), which is the area of the collar section which is in contact with eth rubber stopper (2), comprising a material having a low coefficient of friction against the rubber stopper (2), preferably equal to or smaller than 0.3, more preferably equal to or smaller than 0.25, even more preferably equal to or smaller than 0.15 against the rubber stopper (2).

Preferably, the contact area (718) is a polymer such as a thermoplast or duroplast, examples are POM, PET, PVDF, or PEEK.

The contact area (718) may be provided in the form of a coating, and/or in the form of a separate part, for instance a sliding ring or sliding disc.

This contact area should facilitate the rotation of the movement member (71) relative to the rubber stopper (2).

The support member (70) may contain a contact area (705) comprising a material having a high coefficient of friction against glass, preferably equal or greater than 0.4, more preferably equal or greater than 0.5, even more preferably equal or greater than 0.6 against glass.

When rotating the movement member (71) relative to the support member (70), the contact area (705) due to a sufficiently high friction between the support member (70) and the drug container (3), contributes to substantially avoiding or minimizing a movement, e.g. a slipping, of the support member (70) relative to the drug container (3).

Preferably, a housing (9) covers the top of the main body (10) thereby providing a sealed space inside the housing (9), into which test medium (4) is inserted via the test medium supply (13).

An according device (1) can be derived from PCT/EP2018/074731 with filing date Sep. 13, 2018, which is incorporated herewith by reference in its entirety.

Figure 12:
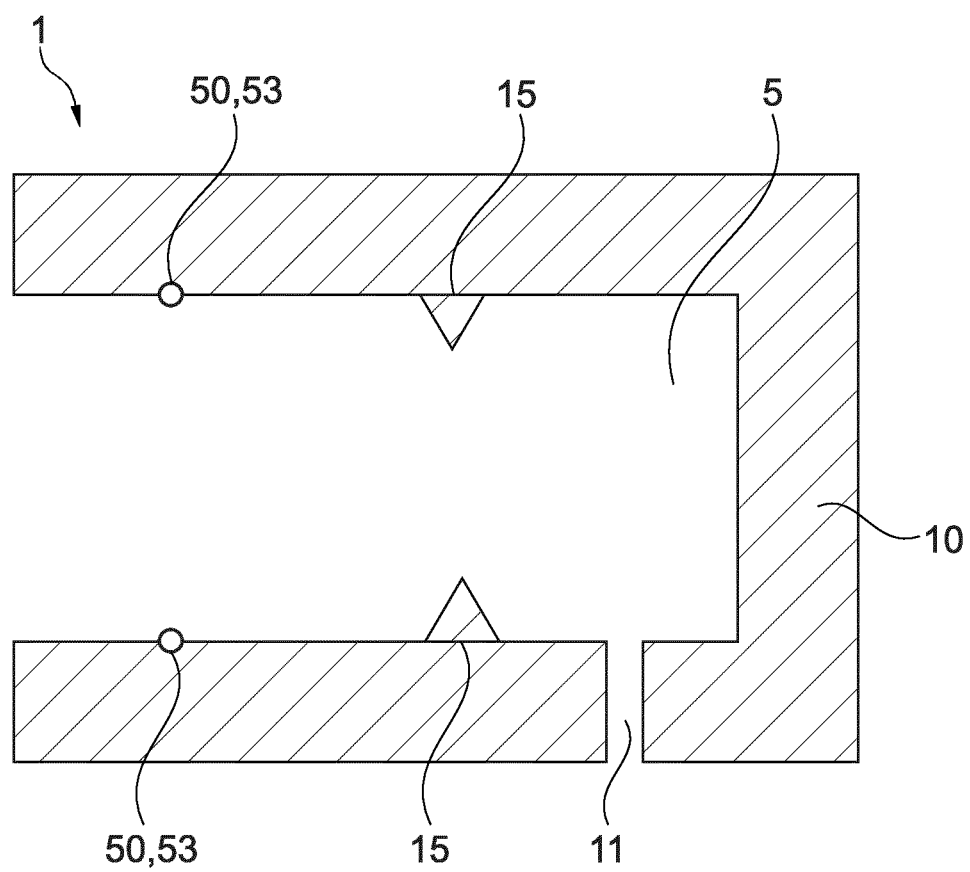
FIG. 12 schematically shows another exemplary embodiment of a device for providing a displacement of a rubber stopper for leakage testing of a connection between the rubber stopper and a corresponding drug container.
Figure 13:
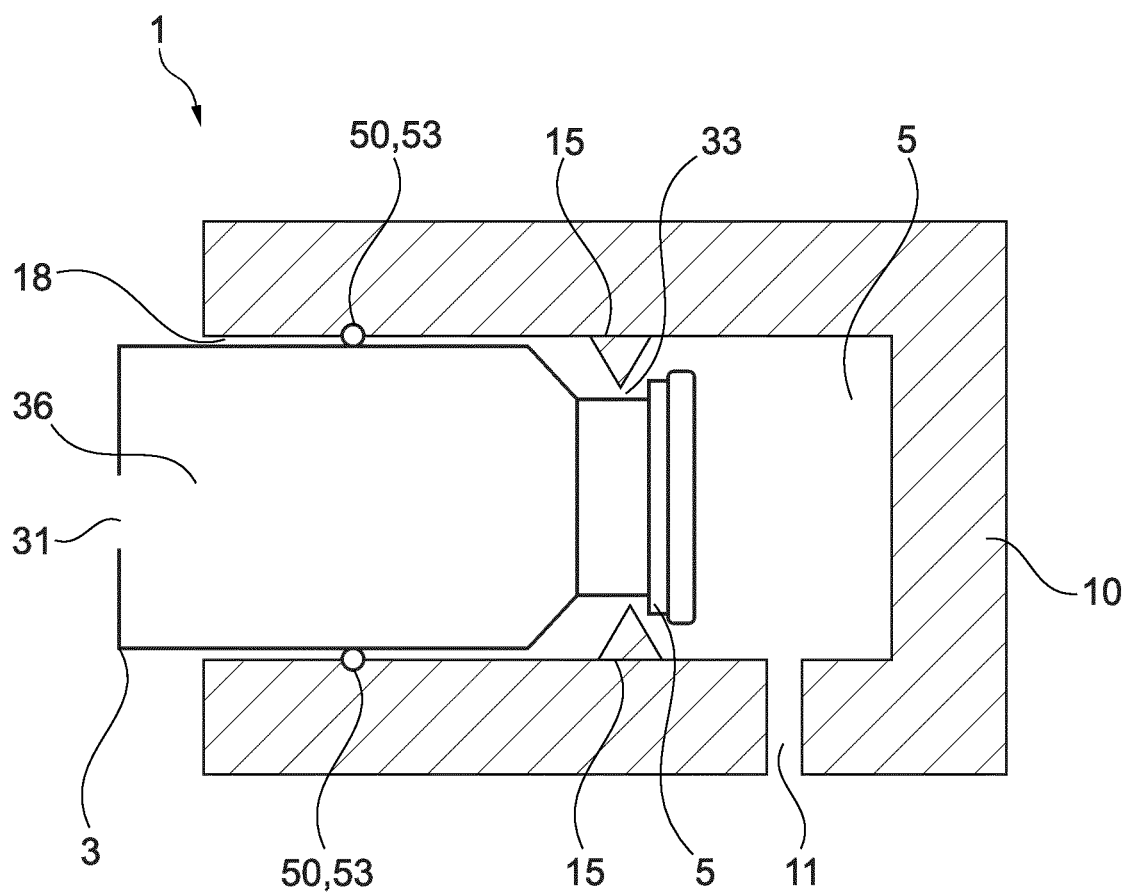
FIG. 13 shows the device of FIG. 12 having a drug container inserted in its drug container receptacle.

FIGS. 12 and 13 schematically show a device (1), which comprises integrated measures to act as positioning unit (15). In this case, the positioning unit (15) could be a protrusion, preferably a rim on the inside of the inner wall of the drug container receptacle (5).

The positioning unit (15) may be of the same or a different material than the sealing (50). In one embodiment of the invention, the positioning unit is made of the same material as the sealing. In another preferred embodiment, said material is a flexible material, such as an elastomer, for example selected from rubber, latex, or silicone. In a further embodiment, the positioning unit is made from a rigid material, such as plastic, metal, or a rigid composite material.

Alternatively, the positioning unit (15) unit may be made of the same or different material as the wall of the drug container receptacle (5). If the positioning unit is integral to the drug container receptacle (5), it is preferred that it is made of the same material as the drug container receptacle (5) and/or the main body (10).

Figure 15:
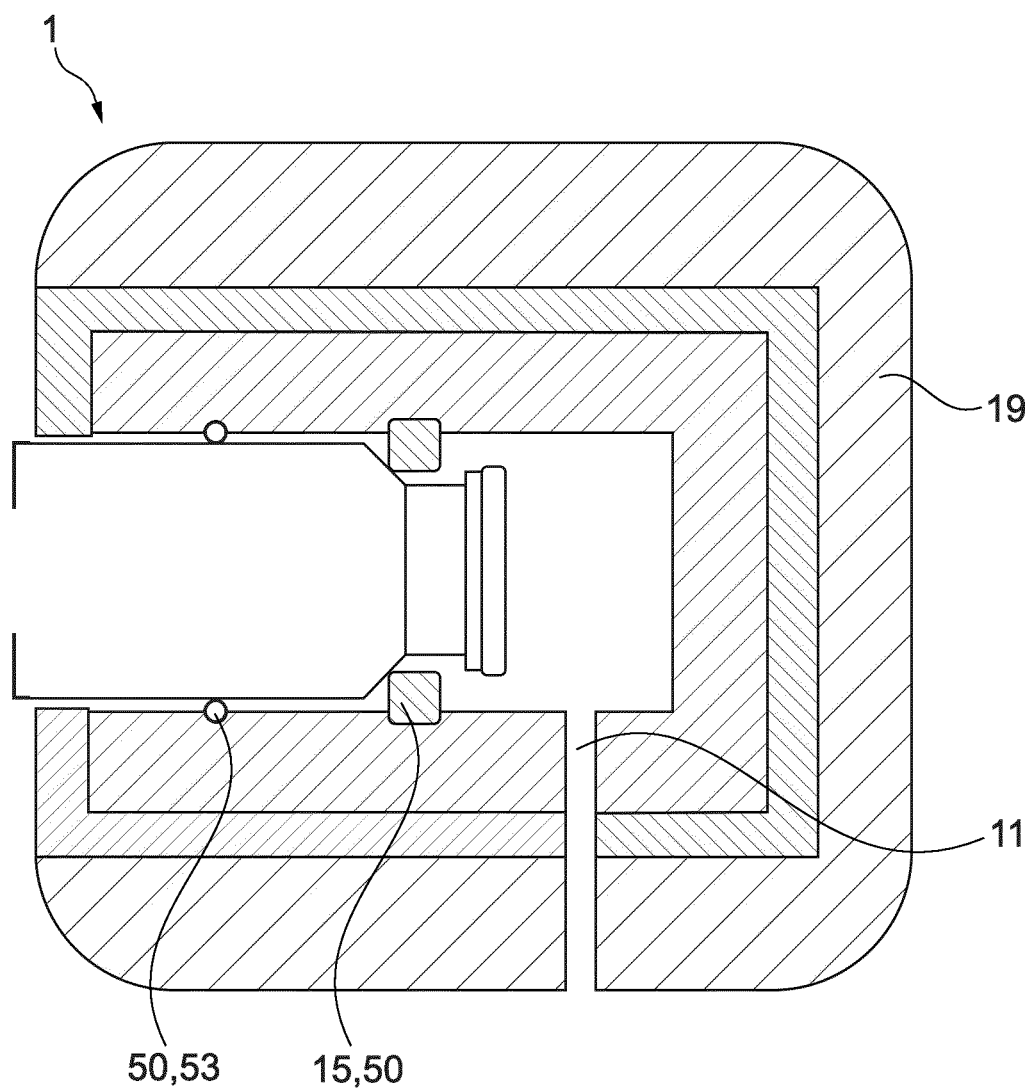
FIG. 15 schematically shows another exemplary embodiment of a device for leakage testing of a connection between a rubber stopper and a corresponding drug container comprising a tempering device.

FIG. 15 shows an embodiment wherein the positioning unit is made of a material different from the material of the wall of the drug container receptacle (5), preferably of a material used for sealing so that the position unit acts simultaneously as sealing (50).

The housing (9) and/or the main body (10) might comprise any suitable material. Particularly suitable materials include, but are not limited to metals, metal alloys or plastic, more preferably steel, aluminum or plastic. The device (1) may be adapted and/or sized for one specific type of drug container (3) defined by its dimensions. Alternatively, the positioning unit (15) and/or sealing (50) and/or the guidings (53) may be exchangeable to allow adaptation of the device (1) to different sizes or shapes of drug containers. If the device (1) is adaptable to different sizes of containers or to different container shapes, it is preferred that the exchangeable sealing (50) and/or positioning unit (15) and/or guidings (53) are made of the same material. Preferably, in this case positioning unit (15) is adapted to also function as sealing (50).

It is important that the drug container receptacle (5), the main body (10) and/or the housing (9) are configured to withstand a pressure difference between the sealed inside and the external environment when the testing conditions are applied.

In another preferred embodiment, the device (1) comprises means to be connected to a computing device.

Figure 19:
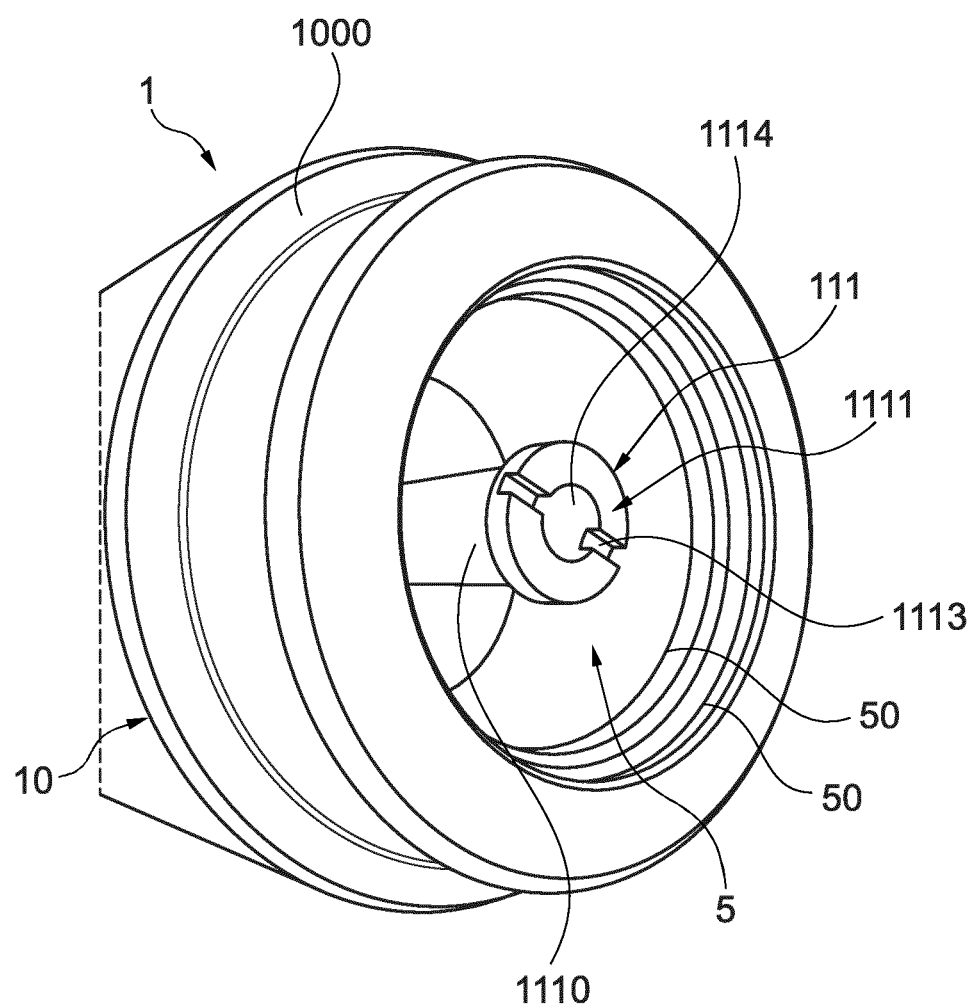
FIG. 19 shows a perspective top view of the embodiment of the device according to FIG. 18.

As shown in FIG. 19 an embodiment of the main body (10) of the device has a step (1000) on the outer circumference. The step (1000) in the upper part of the main body (10). In particular, the outer diameter of the main body (10) is smaller in the upper part. One usage of this step (1000) will be described later with reference to FIGS. 21 and 22.

Figure 18:
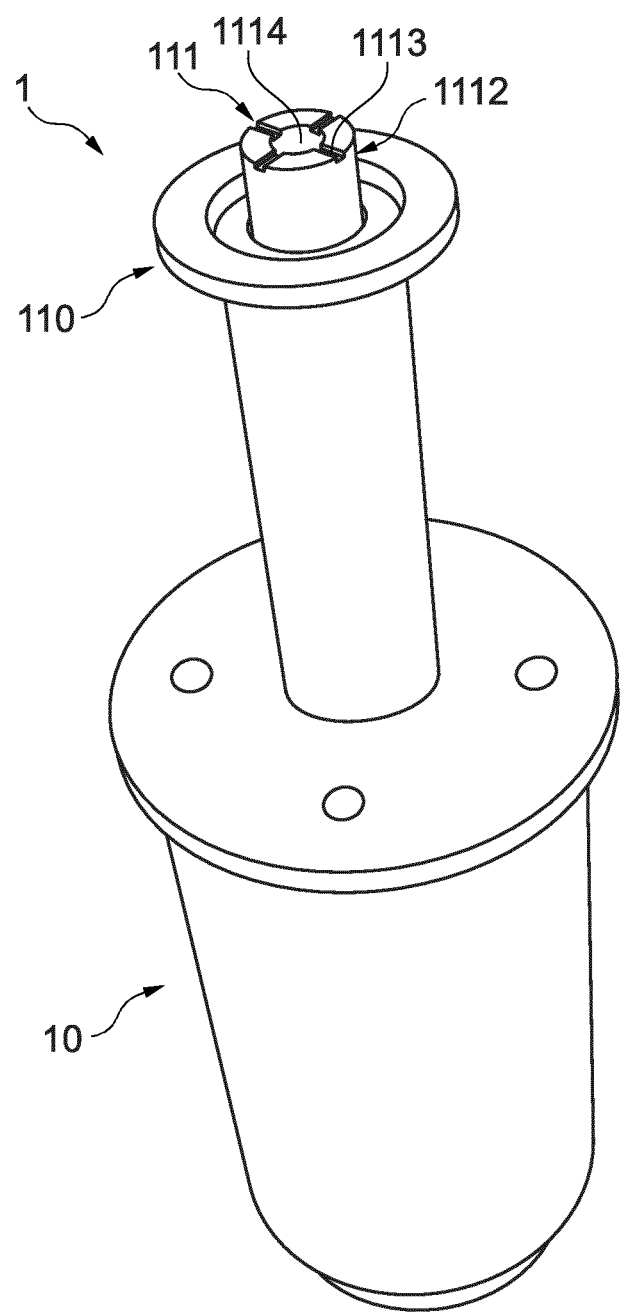
FIG. 18 shows a perspective bottom view of another embodiment of the device.

In FIGS. 18 and 19 an embodiment of the main body (10) of the device is shown, wherein the main body (10) comprises an ejector punch (111). The ejector punch (111) consists of a pipe (1110) with a head (1111) and a foot (1112). The outer diameter of the head (1111) and the foot (1112) are larger than the outer diameter of the pipe (1110). The pipe (1110) extends through the connection channel (not shown in FIGS. 18 and 19). The connection channel corresponds to the connection channel (11) as for example shown in FIGS. 1 and 2. The length of the ejector punch (111) is longer than the distance between the bottom of the drug container receptacle (5) (see FIG. 1) and the bottom of the flange (110). The ejector punch (111) is movably received in the connection channel. In a retracted state of the head (1111) of the ejector punch (111) rests on the bottom of the drug container receptacle (5), in particular on the bottom of the receptacle chamber (52). The diameter of the head (1111) is larger than the diameter of the connection channel. In FIG. 19 the position of the ejector punch (111) is shown in an extended state. In this extended state, the head (1111) of the ejector punch (111) is at a height in the receptacle chamber (52) which corresponds to the height of the sealing rings (50). By moving the ejector punch (111) from the retracted state to the extended state, a vial or other drug container (not shown), which was held in the drug container receptacle (5) and was sealed on its outer circumference be the sealing rings (50), can be pushed away from the bottom of the receptacle chamber 52. Thereby, removing the drug container (3) after testing is simplified.

As can be derived from FIGS. 18 and 19, according to one embodiment, the head (1111) and the foot (1112) of the ejector punch (111) have a slot (1113). The slot (1113) in the head (1111) is provided in the upper surface of the head (1111) and the slot (1113) at the foot (1112) is provided in the lower surface of the foot (1112). The slot (1113) extends over the diameter of the foot (1112) or the diameter of the head (1111), respectively. Thereby, fluid connection between the outer circumference of the head (1111) or foot (1113), respectively and the channel (1114) of the pipe (1110) can be ensured, even if the head (1111) or foot (1113) are in contact with other elements. For example, air can be drawn into the drug container receptacle (5) through the pipe (1110), when the drug container (3) which was received and sealed in drug container receptacle (5) by the sealing rings (50) is pushed out of the drug container receptacle (5). Due to the air tightness obtained by the sealing rings (50) moving the drug container (3) would not be possible without allowing air to enter the drug container receptacle (5).

With this embodiment of the device, where an ejector punch (111) is provided in the main body, the method according to the invention can comprise a step of pushing the ejector punch (111) from a retracted state to an extended state after the testing has been completed. Thereby, handling of the drug container (3) is facilitated. The embodiment with the main body (10) having an ejector punch (111) is preferably used for embodiments of the device (1), wherein the support member (70) and the movement member (71) are arranged above the drug container (3), in particular outside of the drug container receptacle (5).

Figure 20:
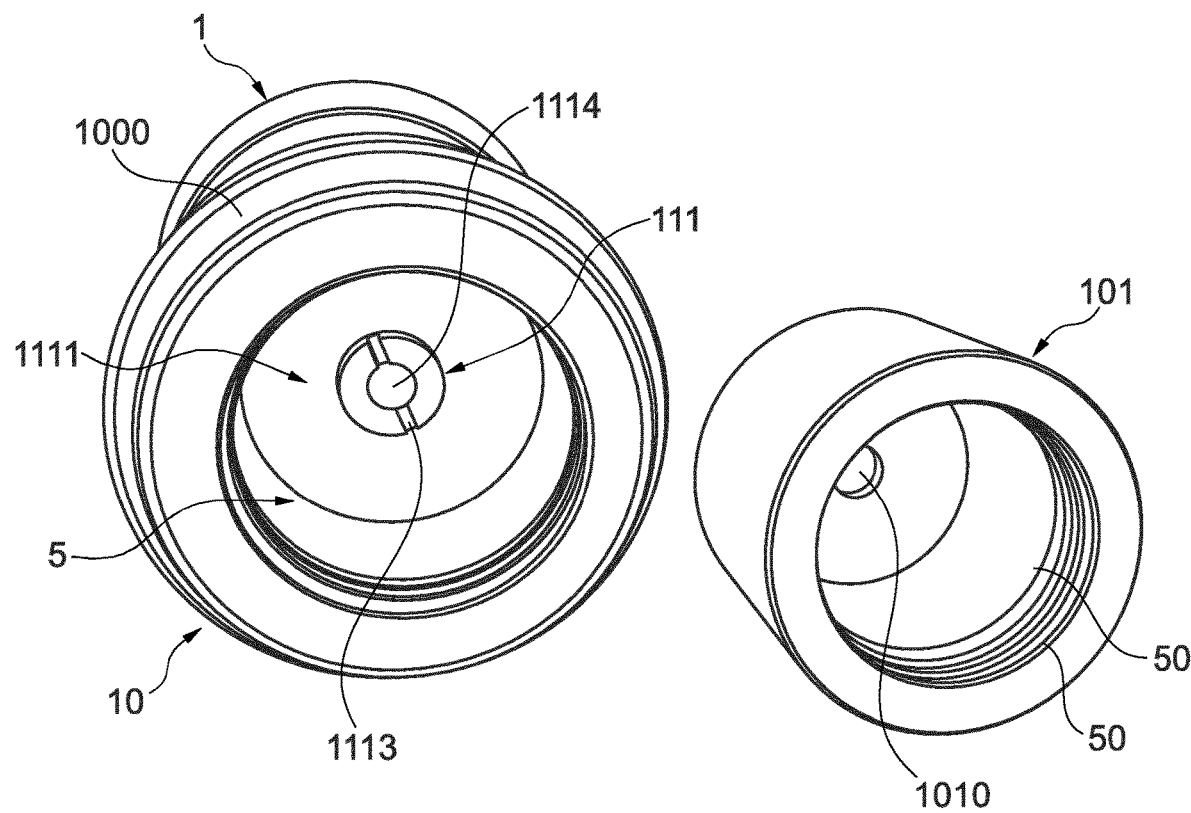
FIG. 20 shows a perspective top view of the main body of the embodiment of FIG. 14.

In FIG. 20 another embodiment of the main body (10) of a device is shown. This embodiment differs from the embodiment shown in FIGS. 18 and 19 in that the device comprises an adapter cylinder (101). The adapter cylinder (101) has a cylindrical wall and is open at the top and closed at the bottom. In the bottom a through hole (1010) is provided. The outer diameter of the adapter cylinder (101) corresponds to the inner diameter of the drug container receptacle (5) in the main body (10). In particular, the outer diameter of the adapter cylinder (101) is equal or larger than the inner diameter of the sealing rings (50) provided at the inner diameter of the drug container receptacle (5). Also at the inner diameter of the adapter cylinder (101) sealing rings (50) are provided. The through hole (1010) has a diameter which is equal to or larger than the diameter of the channel (1114) in the ejector punch (111). Once the adapter cylinder (101) has been inserted into the drug container receptacle (5) of the main body (10), the adapter cylinder (101) acts as a receptacle chamber (52) for a drug container (3). Thereby, drug containers (3) of different sizes can be tested with the device, by selecting and inserting an adapter cylinder (101) of an appropriate inner diameter. As the device can include an ejector punch (111), the adapter cylinder (101) can be pushed out of the drug container receptacle (5) and can either be replaced by a different adapter cylinder (101) or a drug container (3) having a larger diameter may be inserted into the drug container receptacle (5) without an adapter cylinder (101). Also this embodiment with an adapter cylinder (101) is preferably used for embodiments of the device (1), wherein the support member (70) for supporting the device (1) and the movement member (71) for supporting the device (1) are arranged above the drug container (3), in particular outside of the drug container receptacle (5).

Figure 21:
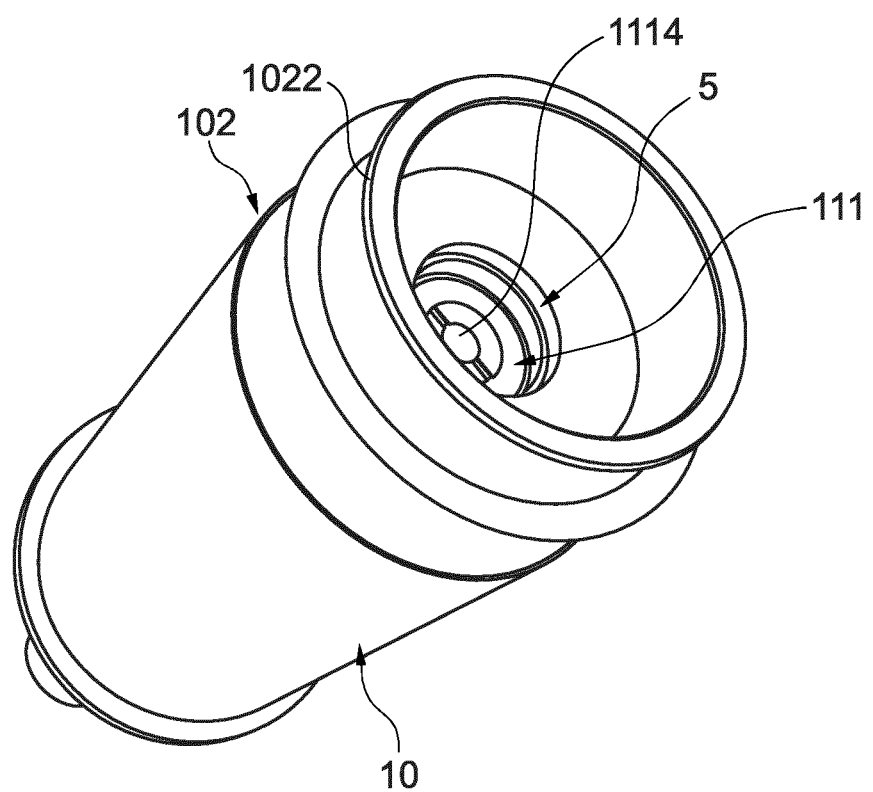
FIG. 21 shows a perspective top view of another embodiment of the device.
Figure 22:
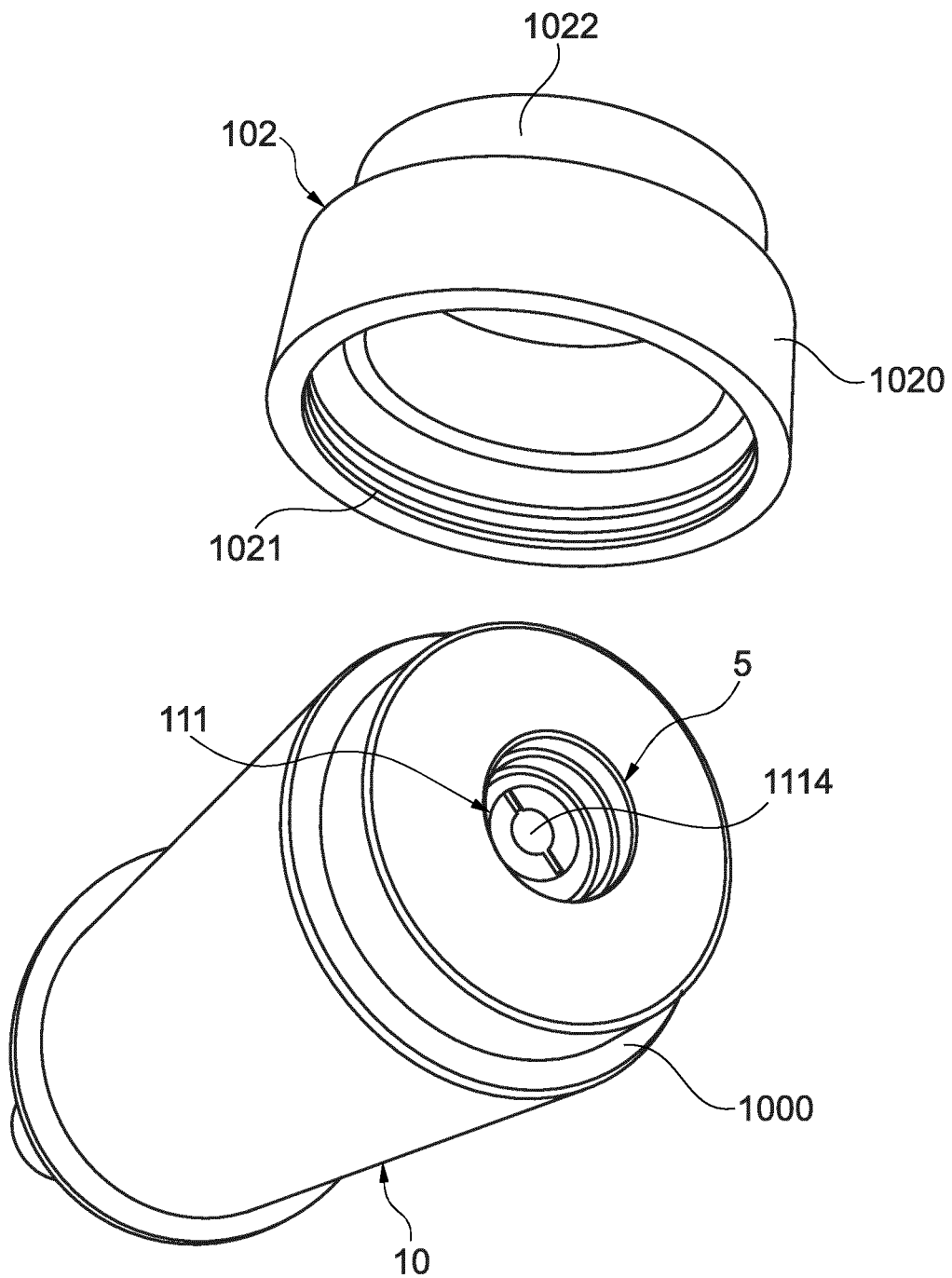
FIG. 22 shows a perspective top view of the embodiment of the device according to FIG. 21 in a disassembled state.

In FIGS. 21 and 22 another embodiment of the main body (10) of the device is shown. This embodiment differs from the embodiment shown in FIGS. 18 and 19 in that a flooding ring (102) is attached to the main body (10). The flooding ring (102) has an attachment section (1020) and a flooding cylinder (1022) extending from the top of the attachment section (1020). The attachment section (1020) has an inner diameter which corresponds to the outer diameter of the main body (10) above the step (1000). The height of the attachment section (1020) corresponds to the distance of the step (100) of the main body (10) to the upper end of the main body (10). The flooding cylinder (1022) has an inner diameter which is smaller than the outer diameter of the main body (10) above the step (1000). Thereby, the flooding cylinder (1022) rests on the upper surface of the main body (10). At the inner diameter of the attachment section (1020) inner sealing rings (1021) are provided. In the embodiment shown in FIGS. 31 and 32 two inner sealing rings (1021) are provided. By providing the flooding ring (102), a space above the upper end of the main body is created. In the upper end of the main body (10), the drug container receptacle (5) is formed.

With the drug container (3) having been introduced into the drug container receptacle (5), the testing of the leakage between the rubber stopper (2) and the drug container (3) will be performed. If the sealing rings (50), which are provided in the drug container receptacle (5), do not sufficiently seal the lower part of the drug container receptacle (5) from the area above the sealing rings (50), air may be drawn into the drug container receptacle (5), thereby decreasing the quality of the test results. With the flooding ring (102) provided on the main body (10), it will be possible to fill the area above the upper end of the main body (1), with a liquid such as oil. Thereby, drawing in of air into the lower part of the drug container receptacle (5) can be avoided.

According to another embodiment, the flooding ring may be integral with the main body. In this case, the flooding ring can comprise only a flooding cylinder, which is extends from the surface of the upper end of the main body, where the drug container receptacle is formed.

In a particular embodiment of the invention, the device (1) according to the invention comprises or is connectable to means for temperature control, in particular cooling means and/or heating means.

The cooling and/or heating means can be realized in form of an own device separate from device (1), for example a device for cooling and/or heating, into which the device (1) is inserted for cooling and/or heating during the test; or the cooling and/or heating means can be comprised in device (1).

In a particular embodiment, the device (1) is connectable to cooling means and the device (1) and the cooling means are connectable to computing means. In a different preferred embodiment, the device (1) additionally comprises cooling means and means to connect to a computing device.

In a preferred embodiment of the invention, the cooling means allow at least the cooling of the closure system, that is of the connection between the rubber stopper (2) and the drug container (3), constituent of regular opening (30) and rubber stopper (2), more preferably, the cooling means allows cooling of at least the drug container (3) comprising, even more preferably, the cooling means allow cooling of the chamber provided by the housing (9) and/or cooling of the drug container receptacle (5), and/or cooling of the main body (10).

In a preferred embodiment, the cooling means are adapted to provide sequential, preferably continuous cooling at least of the aforementioned parts.

Figure 14:
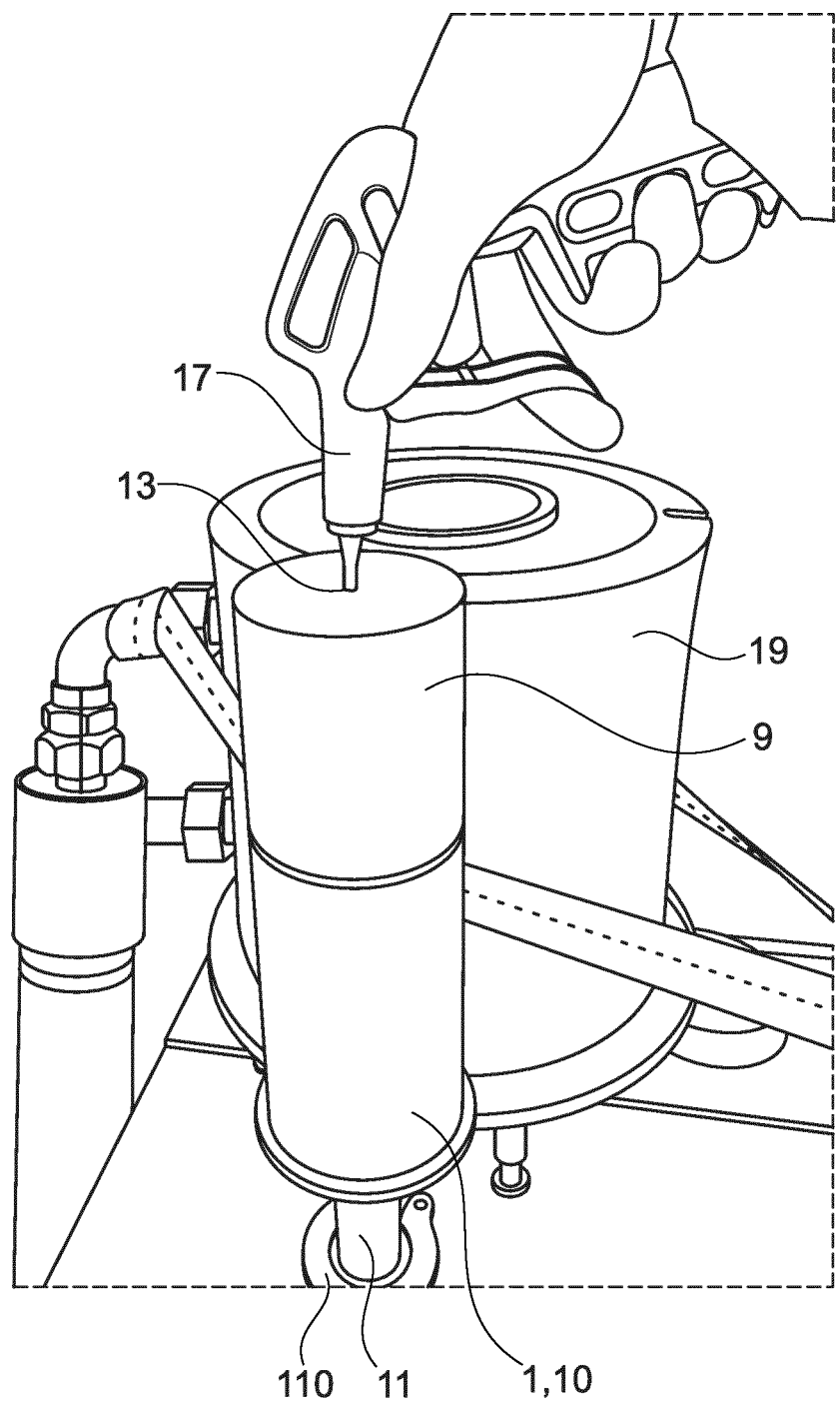
FIG. 14 is a photograph of an exemplary embodiment of a device for leakage testing of a connection between a rubber stopper and a corresponding drug container.

FIG. 14 shows an embodiment of device (1) with the housing (9), a hand held injector (17) for the supply of the test medium into the housing, device (1) with the connection channel (11) ending at the bottom of device (1) in form of a tube with a flange 110 and the cooling and/or heating means implemented as a tempering device (19) being in form of a separate device into which device (1) is inserted for cooling and/or heating during the test.

In a preferred embodiment the cooling means allow cooling to temperatures of at least −20° C. or lower, preferably at least −50° C. or lower, more preferably at least −80° C. or lower, particularly preferably −100° C. or lower, more particularly −196° C. (77 K) or lower.

A computing system may be used which is configured to acquire any status of and/or to control the device (1), and/or the device (1) and/or the means for temperature control, with the device (1), and the device (1) and the means for temperature control as defined herein, also with all their embodiments.

The connection between a rubber stopper (2) and a corresponding drug container (3) to be tested may be any suitable connection. Non-limiting examples for a rubber stopper (2) comprise an elastomeric part which is responsible for the actual closing or sealing of the regular opening (30) of the drug container (3) which needs to be closed. Examples for the material of the elastomeric part are rubber or silicone. The form of the elastomeric part can be a plug or a lid. The connection between the regular opening (30) of the drug container (3) and the rubber stopper (2) can also comprise means for fixing the rubber stopper (2) to the regular opening (30) of the container (3), preferably by engaging between the rubber stopper (2) and the neck portion 33. An example for such means for fixing the rubber stopper (2) to the regular opening (30) of the container (3) are known to the skilled person under the term "blowback".

With respect to the exemplary device (1) shown e.g. in FIG. 3 or 5, a pressure difference between the interior 36 of the drug container (3) and the inside of the receptacle chamber 52 can for example be generated by evacuating the inside of the receptacle chamber 52, by applying pressure at the inside of the drug container (3), or by both measures, preferably by evacuating the inside of the receptacle chamber 52.

Furthermore, the method for leakage testing of a connection between a rubber stopper (2) and a corresponding drug container (3) may be a destructive or non-destructive method. In a non-destructive method, the container (3) may be filled with the testing gas before the container (3) is closed with the rubber stopper (2). In a destructive method, the container may comprise the communication opening 31.

Preferably, detection of the test medium passing through a leakage between the regular opening (30) and the rubber stopper (2) is done in form of a concentration, of a flow rate or of an amount, more preferably in form of a flow rate, of the test medium.

Preferably, the pressure inside the device (1), preferably in the preferably sealed receptacle chamber 52, may be set to equal to or less than 100 mbar, more preferably equal to or less than 50 mbar, even more preferably equal to or less than 25 mbar, especially equal to or less than 20 mbar, more especially equal to or less than 10 mbar, even more especially equal to or less than 5 mbar, in particular equal to or less than 1 mbar.

In a different embodiment of the invention, a pressure difference is generated, preferably by applying a vacuum to the inside of the device (1), that is in the receptacle chamber 52. Preferably, in such embodiments, the vacuum in the inside of the device (1) is continuously reduced, while the pressure of the test medium inside the drug container (3) is maintained constant.

In a preferred embodiment, the constant pressure is atmospheric pressure.

Preferably, the drug container (3) is filled with a test medium atmosphere, comprising at least 50%, even more preferably, at least 75%, especially at least 80%, more especially at least 85%, even more especially at least 90%, in particular at least 95%, of test medium, the % being % by volume based on the total volume of the atmosphere inside of the drug container (3).

The method according to the invention is suitable to be performed temperature independent.

In one embodiment, the temperature is controlled in the method.

In particular, the method might be performed at constant temperature or at varying temperature. In particular the method is suitable to test the integrity of the closure system, that is of the connection between the rubber stopper (2) and the drug container (3), at typical storage temperatures. Preferably, the temperature refers to the temperature of the receptacle chamber 52, of the main body (10), of an inner wall of the drug container receptacle (5), of the drug container (3), or of a combination thereof.

It is preferred that the temperature referred to herein refers at least to the temperature of and/or around the neck portion 33 and/or the regular opening (30) of the container (3).

In a particular embodiment, the main body (10) and/or the drug container receptacle (5) are temperature controlled.

In some embodiments the method is performed at room temperature. In a specific embodiment the method is performed at 18 to 27° C., preferably at 20 to 26° C., more preferably at 22 to 25° C., even more preferably at about 24 to 25° C.

The method might be performed at higher or lower temperatures than room temperature. In particular, the method might be performed at lower temperatures than room temperature. In some embodiments, the method is performed at 20° C. or less, in other embodiments at 15° C. or less, in further embodiments at 10° C. or less.

In a specific embodiment of the invention, the method is performed at 0° C. to 10° C., preferably 2° C. to 8° C., more preferably 3° C. to 6° C., particularly preferably at 4° C. to 5° C. In a particular embodiment, the method is performed at 4° C.

In some embodiments of the invention, the method is performed below freezing temperature of water. In some embodiments the method is performed at 0° C. or below. In a specific embodiment, the method is performed at −4° C., −5° C., −6° C., −7° C., −8° C., −9° C., −10° C. or below. In some embodiments, the method is performed at −15° C. or below, in particular −20° C. or below.

The method may be performed at even lower temperatures. In some embodiments of the invention, the method is performed at −30° C., −40° C., −50° C., −60° C., −70° C., −80° C., −90° C., −100° C. or below. In a specific embodiment, the method is performed at a temperature of from −70° C. to −90° C., preferably of from −75° C. to −85° C., more preferably the method is performed at −80° C.

If the cooling is based on a mixture of dry ice and isopropyl alcohol, the method might be performed at about −77° C.

If the cooling is based on liquid nitrogen, the method might be performed at about −196° C.

Optionally, the means for temperature control are adapted such that the temperature can be adjusted to more or less any specific chosen temperature.

The method may also be performed at varying temperatures to determine the suitability for the closure system that is of the connection between the rubber stopper (2) and the drug container (3), for different storage and usage conditions. In such an embodiment, the method additionally comprises the step of varying the temperature.

In a specific embodiment, the invention relates to a method for testing the temperature dependence of the integrity of the connection between the rubber stopper (2) and the corresponding drug container (3).

Thereby, the method further may comprise the additional step of controlling the temperature, preferably at for a predetermined period of time. More preferably, the temperature is controlled over the entire time of testing.

In some embodiments of the invention, the temperature is varied sequentially. In other embodiments the temperature is varied continuously. In a preferred embodiment, the temperature is varied continuously, with a linear change of temperature. In a specific embodiment, the temperature is continuously lowered with a linear rate.

The method may optionally comprise the step of identifying at least one threshold temperature, until which safe handling and/or storing of the drug container (3) without affecting the integrity of the connection between rubber stopper (2) and regular opening (30) is provided.

In one embodiment, the method is performed at a predetermined temperature. Therefore, a tempering medium, preferably a tempering liquid may be provided, wherein preferably, the tempering medium may be provided with a predefined temperature.

According to some preferred embodiments, the receptacle (5) optionally forms a tempering gap 18, which may be located between the inner wall of the container receptacle (5) and the drug container (3). Preferably, the tempering gap 18 is located opposite to the connection channel (11) with respect to a sealing (50).

Figure 17:
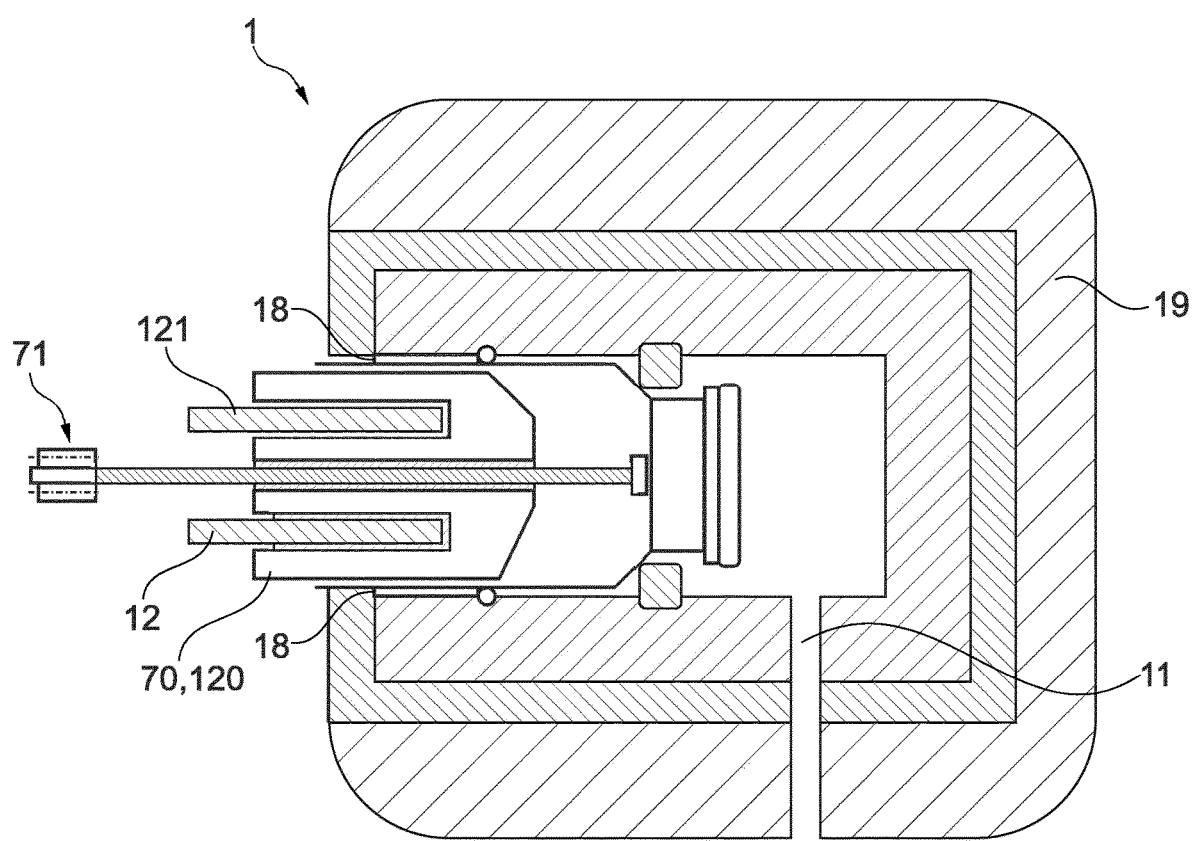
FIG. 17 schematically shows a device according to FIG. 16 comprising a tempering device according to FIG. 15.

In some embodiments of the invention, the tempering medium may be led into the tempering gap 18; see for example FIG. 17.

According to a preferred embodiment, the device comprises means for temperature control in the form of a separate tempering device. Preferably the tempering device is formed such the main body (10) and/or the housing (9) can be inserted into the tempering device.

In some embodiments, the tempering device is a double walled device, wherein preferably the temperature may be controlled by leading tempering medium through the double walled wall at the desired temperature.

Figure 16:
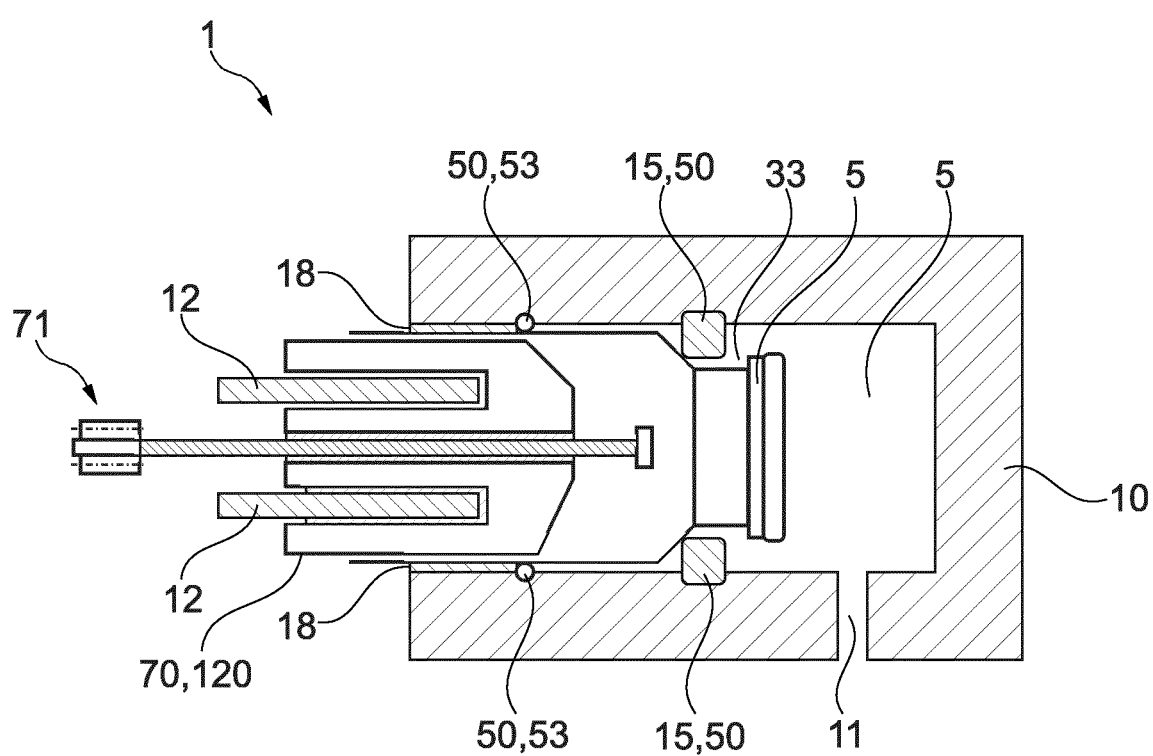
FIG. 16 schematically shows a device according to another preferred embodiment comprising a temperature sensor.

A schematic view of a device (1) comprising a tempering device (19) can be seen in FIGS. 15 and 16.

According to another preferred embodiment, the device (1) may comprise one or more temperature sensors and/or means for sensor positioning means adapted for positioning one or more temperature sensors into device (1).

In one embodiment, one or more temperature sensors can be placed in or are located in the drug container (3) and/or in the device (1).

The invention further relates to a temperature sensor for use with a device (1) as defined herein, also with all its embodiments.

In one embodiment, the device (1) comprises or is used with a holding device (120) for holding one or more temperature sensors 12 within the drug container (3), wherein preferably, the holding device (120) can be placed in or is located in the drug container (3).

In FIGS. 17 and 18, a schematic example of holding device (120) can be seen wherein a support member functioning analogously to the embodiment shown in FIGS. 10 and 11 also functions as the holding device (120). In general, a holding device (120) according to the invention comprises at least one opening (121), which allows the insertion of a temperature sensor (12). In some embodiments, holding device (120) has a plurality of openings (121). In some embodiments holding device (120) comprises at least one temperature sensor (12) or has means for placing at least one temperature sensor into holding device (120).

The holding device (120) may preferably be adapted to a specific type of drug container (3), comprising means for measuring the temperature of holding device (120) and comprising at least one means for passing a test medium into said drug container (3).

In some embodiments, said opening (121) can be filled with tempering medium to allow for accurate temperature measurement, for example when tempering medium is filled in the opening (121) then tempering medium mediates the passing of the temperature from holding device (120) to a temperature sensor inserted in the opening (121).

The holding device (120) may be made from any suitable material but is preferably made of metal.

In some embodiments holding device (120) may be configured to be inserted into the drug container (3). At least in this case, preferably the holding device (120) may comprise a passing section 122 for allowing test medium to pass into the drug container (3), for example a plurality of channels or holes extending through the holding device (120).

The holding device (120) may also comprises or can be connected to a device for temperature control.

The invention further relates to a computer program comprising instructions which when the program is executed by a computer, causes the computer to acquire any status of and/or to cause the device (1) to perform any of steps e), f) and g) of any of the methods of the invention, with the device (1) and the methods of the invention as described herein, also with all their embodiments.

Preferably, the computer program comprises instructions to acquire any status of and/or to cause the device (1) comprising means for temperature control, to perform any of the methods of the invention, with the device (1), the methods of the invention and the means for temperature control as described herein, also with all their embodiments.

The invention further relates to a computer-readable medium having stored thereon the computer program as defined herein, also with all its embodiments.

Except for embodiments and features described herein, the detection unit 6 according to the present invention might be based on a testing device known in the prior art. Such testing devices for leak detection in container closure integrity testing are known to the person skilled in the art. In general, these testing devices are based on mass spectrometric He detection.

It will be obvious for a person skilled in the art that these embodiments and items only depict examples of a plurality of possibilities. Hence, the embodiments shown here should not be understood to form a limitation of these features and configurations. Any possible combination and configuration of the features described herein can be chosen according to the scope of the invention.

LIST OF REFERENCE NUMERALS 1 device
2 rubber stopper
20 collar
21 insertion section
3 drug container
30 regular opening
31 communication opening 310 inner wall
32 opening direction
33 neck portion
34 outer diameter
35 shoulder
36 interior
37 collar
4 test medium
5 drug container receptacle
50 sealing
52 receptacle chamber
53 guiding
6 detection unit
70 support member
700 thread
702 diameter of collar section
703 support section
704 abutment section
705 contact area
71 movement member
710 thread
713 collar section
715 threaded rod
716 tooth
717 engagement section
718 contact area
719 alignment section
72 movement direction
73 linear travel
75 distance
8 movement unit
80 gear wheel
9 housing
10 main body
100 positioning section
1000 step
101 adaptor cylinder
1010 through hole
1011 sealing ring
102 flooding ring
1020 attachment section
1021 inner sealing ring
1022 flooding cylinder
11 connection channel
110 flange
111 ejector punch
1110 pipe
1111 head
1112 foot
1113 slot
1114 channel
12 temperature sensor
120 holding device
121 opening
13 test medium supply
15 positioning unit
16 down-holding unit
17 injector
18 gap
19 tempering device

The invention claimed is:

1. A computing system for acquiring a status of and/or controlling a device for testing leakage of a drug container, the device comprising:
a support member;
a movement member; and
a drug container receptacle for receiving the drug container;
wherein the support member supports the movement member, the movement member is movable relative to the support member in a movement direction which is parallel to the opening direction of a rubber stopper disposed in a stopper opening of the drug container, and the movement member extends into the drug container receptacle for the displacement of the rubber stopper such that part of the movement member is inserted into the drug container through a communication hole which is provided at the drug container apart from its stopper opening for enabling fluid communication of the interior of the drug container and the exterior of the drug container;
wherein the computing system is configured to acquire a status of and/or control the device for leakage testing of the drug container.

2. The computing system of claim 1 wherein controlling the device comprises controlling the temperature.

3. The computing system of claim 1 wherein controlling the device comprises exposing a test medium to at least one of the exterior of the drug container and the interior of the drug container.

4. The computing system of claim 3 wherein controlling the device comprises detecting the presence of the test medium that has passed through the stopper opening of the drug container due to a leakage between the rubber stopper and the drug container.

5. The computing system of claim 3 wherein controlling the device comprises displacing the rubber stopper relative to the drug container in the opening direction for a chosen distance while measuring any presence of the test medium in at least one of the interior and the exterior of the drug container.

6. The computing system of claim 5 wherein the computing system causes the movement member to displace the rubber stopper relative to the drug container.

7. A non-transitory computer-readable medium having stored thereon a computer program for causing a leakage testing device to test a connection between a rubber stopper and a drug container, wherein the rubber stopper is disposed in a stopper opening in the drug container, wherein the device comprises:
a support member;
a movement member; and
a drug container receptacle for receiving the drug container;
wherein the support member supports the movement member, the movement member is movable relative to the support member in a movement direction which is parallel to the opening direction of the rubber stopper, and the movement member extends into the drug container receptacle for the displacement of the rubber stopper such that part of the movement member is inserted into the drug container through a communication hole which is provided at the drug container apart from its stopper opening for enabling fluid communication of the interior of the drug container and the exterior of the drug container;
wherein the computer program comprises instructions for testing the connection between the rubber stopper and the drug container.

8. The non-transitory computer-readable medium having stored thereon a computer program according to claim 7 wherein the computer program causes the device to expose a test medium to at least one of the exterior of the drug container and the interior of the drug container.

9. The non-transitory computer-readable medium having stored thereon a computer program according to claim 8 wherein the computer program causes the device to detect the presence of the test medium that has passed through the opening of the drug container due to a leakage between the rubber stopper and the drug container.

10. The non-transitory computer-readable medium having stored thereon a computer program according to claim 8 wherein the computer program causes the device to displace the rubber stopper relative to the drug container in an opening direction for a chosen distance while measuring any presence of the test medium in at least one of the interior and the exterior of the drug container.

11. The non-transitory computer-readable medium having stored thereon a computer program according to claim 10 wherein the computing system causes the movement member to displace the rubber stopper relative to the drug container.

* * * * *